United States Patent
Kuwata et al.

(10) Patent No.: US 9,951,918 B2
(45) Date of Patent: Apr. 24, 2018

(54) VEHICLE HEADLIGHT DEVICE AND LIGHT GUIDE ELEMENT

(71) Applicant: MITSUBISHI ELECTRIC CORPORATION, Tokyo (JP)

(72) Inventors: Muneharu Kuwata, Tokyo (JP); Masashige Suwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 99 days.

(21) Appl. No.: 14/902,279

(22) PCT Filed: Jul. 24, 2014

(86) PCT No.: PCT/JP2014/069569
§ 371 (c)(1),
(2) Date: Dec. 30, 2015

(87) PCT Pub. No.: WO2015/022848
PCT Pub. Date: Feb. 19, 2015

(65) Prior Publication Data
US 2016/0369966 A1    Dec. 22, 2016

(30) Foreign Application Priority Data
Aug. 12, 2013 (JP) .................................. 2013-167330

(51) Int. Cl.
*F21V 9/00* (2018.01)
*F21S 8/10* (2006.01)
(Continued)

(52) U.S. Cl.
CPC .............. *F21S 48/1241* (2013.01); *B62J 6/02* (2013.01); *F21S 41/143* (2018.01); *F21S 41/24* (2018.01);
(Continued)

(58) Field of Classification Search
CPC .............. F21S 48/1241; F21S 48/1154; F21S 48/1721; F21S 48/1291; F21S 48/1329;
(Continued)

(56) References Cited

U.S. PATENT DOCUMENTS 3,385,961 A * 5/1968 Lemberger ............... B60Q 1/10
362/467
5,436,806 A * 7/1995 Kato .................... G02B 6/0006
362/459
(Continued)

FOREIGN PATENT DOCUMENTS

CN    1619210 A    5/2005
CN    102374497 A    3/2012
(Continued)

*Primary Examiner* — Alexander Garlen
(74) *Attorney, Agent, or Firm* — Birch, Stewart, Kolasch & Birch, LLP

(57) ABSTRACT

A headlight device includes: a light source that emits light; a light guide element that receives the light emitted from the light source through an incident surface and guides the received light to emit the guided light from an emitting surface; and a radiation optical system that radiates the light emitted from the emitting surface ahead of a vehicle. The light guide element includes: a first light guide portion that extends from the incident surface to the emitting surface and guides the received light; and a second light guide portion that is in contact with the first light guide portion, extends from the incident surface to the emitting surface, and guides the received light. The first and second light guide portions have different refractive indexes. The light guide element is configured so that part of light entering the first light guide portion can enter the second light guide portion.

7 Claims, 24 Drawing Sheets

(51) Int. Cl.
*G02B 19/00* (2006.01)
*B62J 6/02* (2006.01)
*B60Q 1/124* (2006.01)

(52) U.S. Cl.
CPC ........ *F21S 41/635* (2018.01); *G02B 19/0014* (2013.01); *G02B 19/0061* (2013.01); *B60Q 1/124* (2013.01); *B60Q 2300/136* (2013.01); *F21S 41/27* (2018.01)

(58) Field of Classification Search
CPC . F21S 48/1266; B60Q 1/124; G02B 19/0014; G02B 19/0061; B62J 6/02
See application file for complete search history.

(56) References Cited

U.S. PATENT DOCUMENTS

| | | | |
|---|---|---|---|
| 5,499,166 A * | 3/1996 | Kato | B60Q 1/0011 362/511 |
| 5,601,354 A | 2/1997 | Horii et al. | |
| 5,685,627 A * | 11/1997 | Kato | G02B 6/0008 362/307 |
| 5,697,690 A | 12/1997 | Okuchi et al. | |
| 2004/0161192 A1 | 8/2004 | Hamano et al. | |
| 2005/0111235 A1 | 5/2005 | Suzuki et al. | |
| 2008/0137357 A1 | 6/2008 | Friedrichs et al. | |
| 2012/0044699 A1* | 2/2012 | Anderson | F21V 5/04 362/307 |
| 2012/0275173 A1 | 11/2012 | Hamm et al. | |
| 2013/0148369 A1 | 6/2013 | Haest | |

FOREIGN PATENT DOCUMENTS

| | | |
|---|---|---|
| CN | 103068669 A | 4/2013 |
| DE | 102011085315 A1 | 5/2013 |
| FR | 2 804 494 A1 | 8/2001 |
| JP | 6-068702 A | 3/1994 |
| JP | 7-312103 A | 11/1995 |
| JP | 8-031201 A | 2/1996 |
| JP | 8-138410 A | 5/1996 |
| JP | 2000-111738 A | 4/2000 |
| JP | 2004-152671 A | 4/2000 |
| JP | 2004-199985 A | 7/2004 |
| JP | 2007-271656 A | 10/2007 |

* cited by examiner

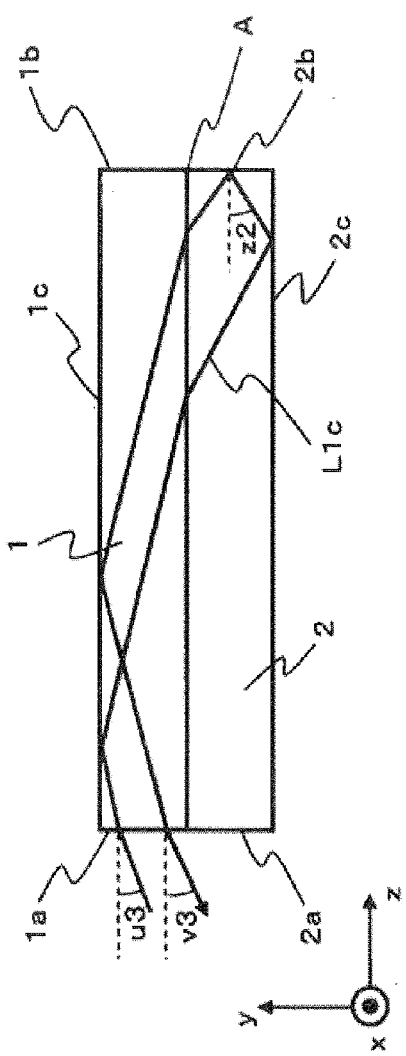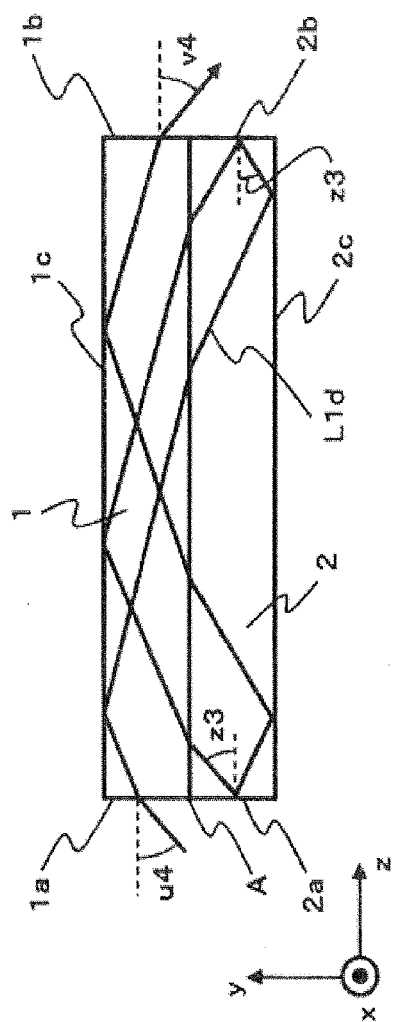

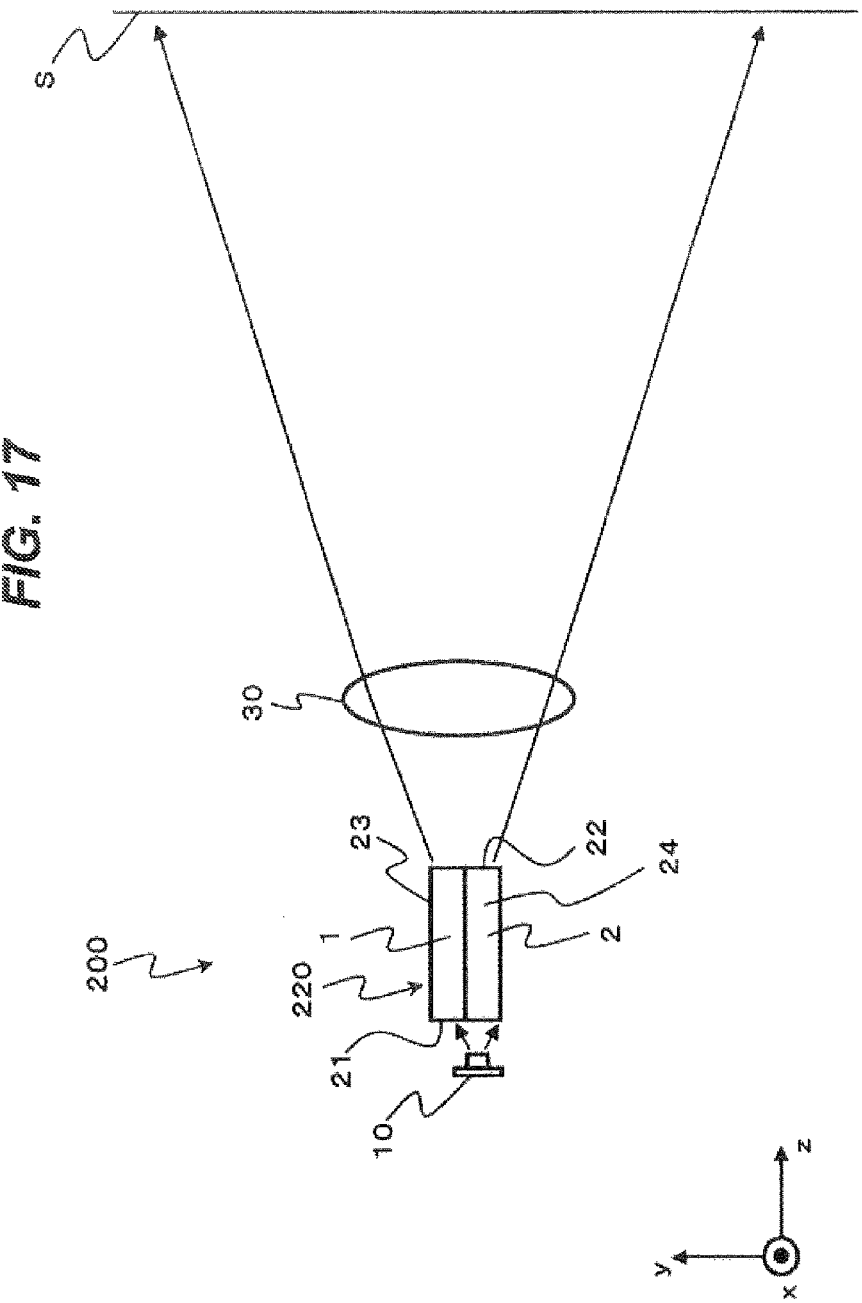

VEHICLE HEADLIGHT DEVICE AND LIGHT GUIDE ELEMENT

TECHNICAL FIELD

The present invention relates to a vehicle headlight device and a light guide element.

BACKGROUND ART

In a vehicle headlight device, it is required to form a predetermined light distribution pattern specified by road traffic rules or the like. "Light distribution" refers to a luminous intensity distribution of a light source with respect to space. That is, it refers to a spatial distribution of light emitted from a light source. "Luminous intensity" indicates the degree of intensity of light emitted by a luminous body and is obtained by dividing the luminous flux passing through a small solid angle in a given direction by the small solid angle. An example of the predetermined light distribution pattern is a light distribution pattern of a low beam. "Low beam" refers to a downward beam, is used in passing an oncoming vehicle or the like, and is also referred to as a headlight for passing each other. Typically, the low beam illuminates about 40 m ahead. To prevent dazzling of an oncoming vehicle, it is required that a cutoff line is formed in the light distribution pattern of the low beam. "Cutoff line" refers to a light/dark separating line or boundary line at an upper end of the light distribution pattern. Specifically, it refers to a light/dark separating line formed at an upper end portion of the irradiated region when a wall or screen is irradiated with light from a vehicle headlight device. Cutoff line is a term used when a radiating direction of the low beam is adjusted. To illuminate an area in a traveling direction of a vehicle particularly brightly, it is also required that the light distribution pattern of the low beam is brightest near and below the cutoff line.

Patent Reference 1 discloses an automobile headlight that reflects light from a light source bulb by a reflecting mirror to radiate it forward and blocks the light by a light blocking plate to form a cutoff line.

PRIOR ART REFERENCES

Patent References

Patent Reference 1: Japanese Patent Application Publication No. 2004-152671

SUMMARY OF THE INVENTION

Problems to be Solved by the Invention

However, in the automobile headlight of Patent Reference 1, the reflecting mirror and light blocking plate are made large so as to receive light spread from the light source bulb. Thus, a drive unit for rotating the light source bulb, reflecting mirror, and light blocking plate is also made large, and the entire device is made large.

An object of the present invention is to provide a small vehicle headlight device capable of providing a desired light distribution pattern.

Means for Solving the Problems

A vehicle headlight device according to the present invention includes: a light source that emits light; a light guide element that receives the light emitted from the light source through an incident surface and guides the received light to emit the guided light from an emitting surface; and a radiation optical system that radiates the light emitted from the emitting surface ahead of a vehicle, wherein the light guide element includes: a first light guide portion that extends from the incident surface to the emitting surface and guides the received light; and a second light guide portion that is in contact with the first light guide portion, extends from the incident surface to the emitting surface, and guides the received light, wherein the first light guide portion and the second light guide portion have different refractive indexes, and wherein the light guide element is configured so that part of light entering the first light guide portion can enter the second light guide portion.

Further, a vehicle headlight device according to the present invention includes: a light source that emits light; a light guide element that receives the light emitted from the light source through an incident surface and guides the received light to emit the guided light from an emitting surface; and a radiation optical system that radiates the light emitted from the emitting surface ahead of a vehicle, wherein the light guide element includes: a first light guide portion that extends from the incident surface to the emitting surface and guides the received light; and a second light guide portion that is in contact with the first light guide portion via a reflecting layer, extends from the incident surface to the emitting surface, and guides the received light, and wherein the reflecting layer has a reflecting surface on each of the first light guide portion side and the second light guide portion side.

Further, a light guide element according to the present invention is a light guide element that receives light emitted from a light source through an incident surface and guides the received light to emit the guided light from an emitting surface, and includes: a first light guide portion that extends from the incident surface to the emitting surface and guides the received light; and a second light guide portion that is in contact with the first light guide portion, extends from the incident surface to the emitting surface, and guides the received light, wherein the first light guide portion and the second light guide portion have different refractive indexes, and wherein the light guide element is configured so that part of light entering the first light guide portion can enter the second light guide portion.

Further, a light guide element according to the present invention is a light guide element that receives light emitted from a light source through an incident surface and guides the received light to emit the guided light from an emitting surface, and includes: a first light guide portion that extends from the incident surface to the emitting surface and guides the received light; and a second light guide portion that is in contact with the first light guide portion via a reflecting layer, extends from the incident surface to the emitting surface, and guides the received light, wherein the reflecting layer has a reflecting surface on each of the first light guide portion side and the second light guide portion side.

Effect of the Invention

According to the present invention, it is possible to provide a small vehicle headlight device capable of providing a desired light distribution pattern.

BRIEF DESCRIPTION OF THE DRAWINGS

FIGS. 4(a) to 4(d) are diagrams illustrating optical paths in the light guide element according to the first embodiment.

FIG. 17 is a diagram schematically illustrating a configuration of a vehicle headlight device according to a second embodiment.

MODES FOR CARRYING OUT THE INVENTION

Embodiments of the present invention will be described below with reference to the drawings.

First Embodiment

Figure 1:
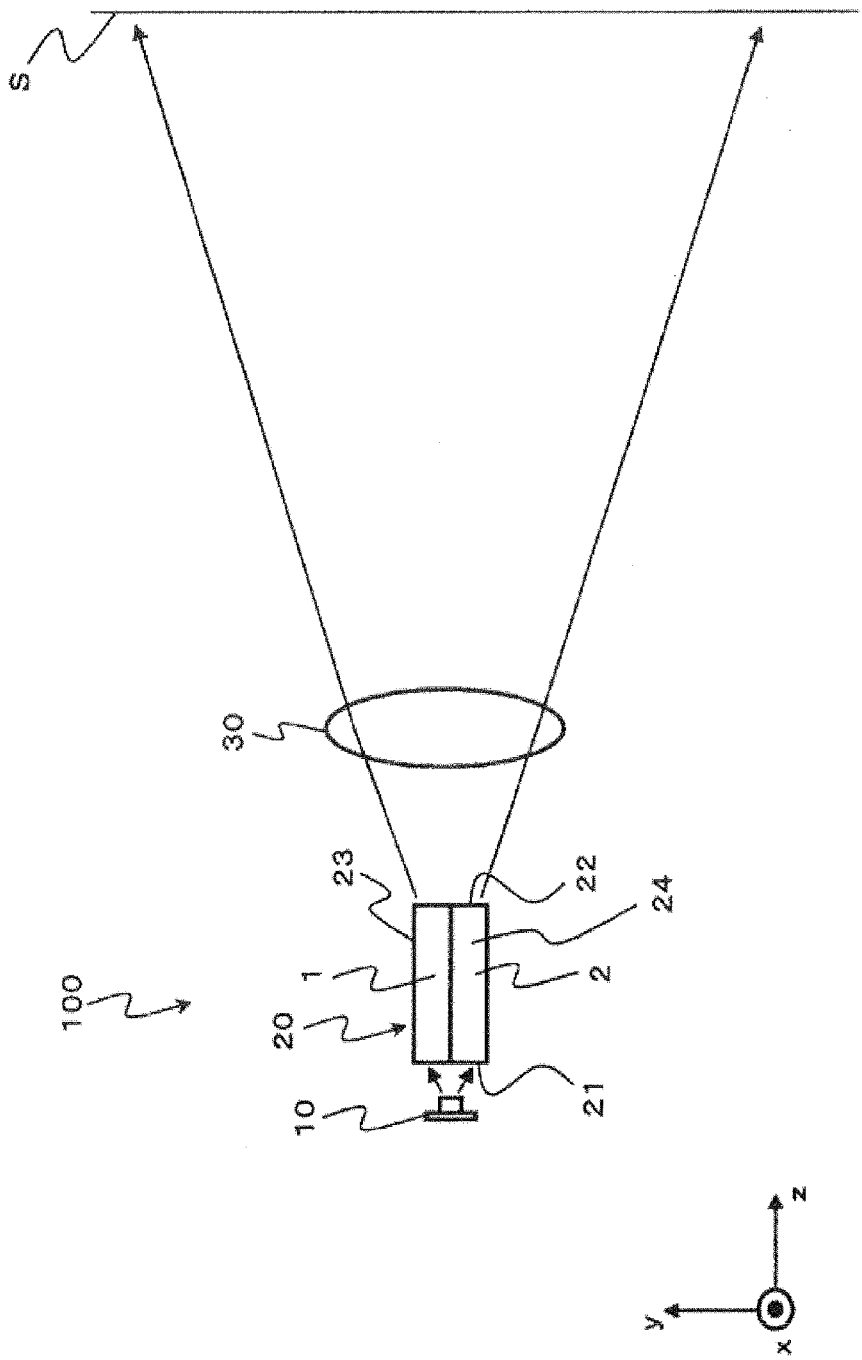
FIG. 1 is a diagram schematically illustrating a configuration of a vehicle headlight device according to a first embodiment.

FIG. 1 is a diagram schematically illustrating a configuration of a vehicle headlight device (hereinafter referred to simply as the "headlight device") 100 according to a first embodiment. The headlight device 100 is a device that is mounted on a vehicle and illuminates an area in front of the vehicle. This example assumes that the headlight device 100 is mounted on a motorcycle. The headlight device 100 is configured to form at least a light distribution pattern of a low beam. The light distribution pattern of the low beam has a horizontal cutoff line, and is brightest near and below the cutoff line. The headlight device 100 is also referred to as a headlamp or headlight.

The following description will be made using xyz-coordinates. It will be assumed that a left-right direction of the vehicle is the x axis direction; the rightward direction with respect to a forward direction of the vehicle is the +x direction; the leftward direction with respect to the forward direction of the vehicle is the −x direction. It will be assumed that an up-down direction of the vehicle is the y axis direction; the upward direction is the +y direction; the downward direction is the −y direction. The upward direction is a direction toward the sky; the downward direction is a direction toward the ground. It will be assumed that a forward-backward direction of the vehicle is the z axis direction; the forward direction is the +z direction; the backward direction is the −z direction. Here, "forward direction" refers to a traveling direction or advancing direction of the vehicle; "backward direction" refers to the opposite direction thereof.

As illustrated in FIG. 1, the headlight device 100 includes a light source 10, a light guide element 20 that guides light from the light source 10, and a radiation optical system 30 that irradiates an irradiated surface S in front of the vehicle with light from the light guide element 20.

The light source 10 emits light for illuminating an area in front of the vehicle. As the light source 10, a discharge lamp, a light emitting diode (LED), an organic electroluminescence element, a laser, or the like may be used. To downsize the headlight device, it is preferable to use an LED or organic EL element that emits light hemispherically, or a laser from which substantially parallel light can be obtained by using a lens or the like as necessary, rather than a discharge lamp that emits light omnidirectionally. In this embodiment, by arranging the light source 10 close to the light guide element 20, it is possible to downsize the light guide element 20 while reducing light loss.

The light guide element 20 is an optical component that receives the light emitted from the light source 10 through an incident surface 21 and guides the light received through the incident surface 21 to emit it from an emitting surface 22. The light guide element 20 guides the light received through the incident surface 21 while internally reflecting it, and emits it from the emitting surface 22. The light guide element 20 has the incident surface 21, the emitting surface 22, and a side surface 23 extending between the incident surface 21 and the emitting surface 22. The light guide element 20 guides the light received through the incident surface 21 while reflecting it by the side surface 23, and emits it from the emitting surface 22. The incident surface 21, emitting surface 22, and side surface 23 define a light guide region 24 for propagating the light incident on the incident surface 21. The incident surface 21 is a surface on which the light emitted from the light source 10 is incident. The incident surface 21 is also referred to as the "light entering surface." The emitting surface 22 is a surface from which the light propagating through the light guide region 24 is emitted. The emitting surface 22 is also referred to as the "light exiting surface." The side surface 23 is a reflecting surface that reflects the light entering through the incident surface 21. The side surface 23 is a surface that connects the incident surface 21 and the emitting surface 22. The light incident on the incident surface 21 from the light source 10 propagates through the inside (i.e., light guide region 24) of the light guide element 20 while being reflected by the side surface 23 and exits from the emitting surface 22. "Propagate" refers to transmitting and spreading, and here refers to traveling of light in the light guide element 20. In this embodiment, the light guide element 20 is formed of optical material, such as glass or plastic. Also, the light guide element 20 is disposed in the air; the side surface 23 is an interface between the optical material and the air and totally reflects the light in the light guide element 20.

Figure 2:
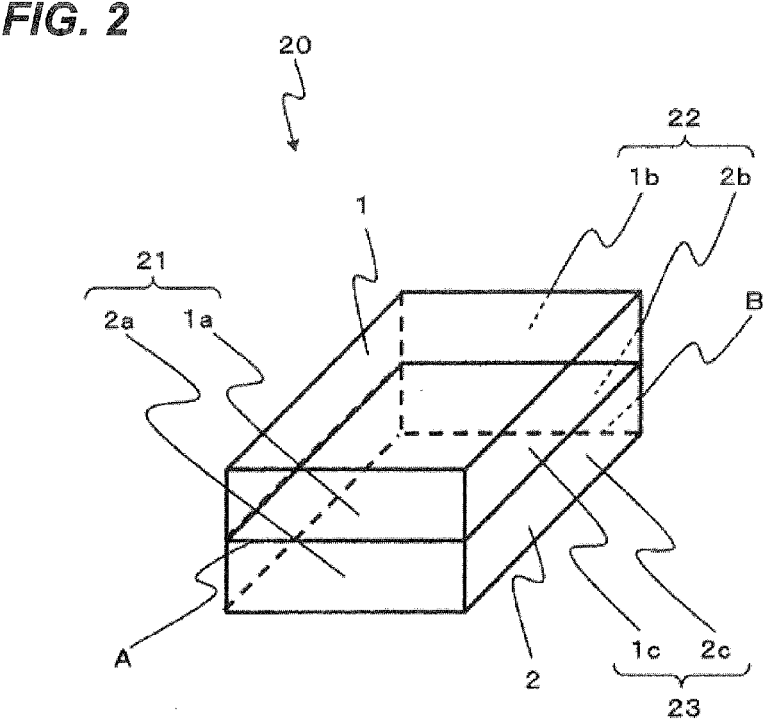
FIG. 2 is a perspective view schematically illustrating a configuration of a light guide element according to the first embodiment.

FIG. 2 is a perspective view of the light guide element 20. The light guide element 20 has a first light guide portion 1 and a second light guide portion 2. The first light guide portion 1 extends from the incident surface 21 to the emitting surface 22 and guides the light incident on the incident surface 21. The second light guide portion 2 is in contact with the first light guide portion 1, extends from the incident surface 21 to the emitting surface 22, and guides the light incident on the incident surface 21. The first light guide portion 1 and the second light guide portion 2 are in contact with each other at a boundary surface A. The first light guide portion 1 and second light guide portion 2 have different refractive indexes. Here, the second light guide portion 2 has a refractive index greater than a refractive index of the first light guide portion 1. When the refractive index of the first light guide portion 1 is denoted by n1 and the refractive index of the second light guide portion 2 is denoted by n2, n1<n2 is satisfied. Also, each of the first light guide portion 1 and second light guide portion 2 has a refractive index greater than the refractive index of air. The light guide element 20 is configured so that part of light entering the first light guide portion 1 can enter the second light guide portion 2.

The first light guide portion 1 has a first incident surface 1a on which light from the light source 10 is incident, a first emitting surface 1b from which light is emitted, a first side surface 1c extending between the first incident surface 1a and the first emitting surface 1b. The first incident surface 1a faces the light source 10 and the first emitting surface 1b opposes the first incident surface 1a. The second light guide portion 2 has a second incident surface 2a on which light from the light source 10 is incident, a second emitting surface 2b from which light is emitted, and a second side surface 2c extending between the second incident surface 2a and the second emitting surface 2b. The second incident surface 2a faces the light source 10 and the second emitting surface 2b opposes the second incident surface 2a. The first incident surface 1a and second incident surface 2a constitute the incident surface 21. The first emitting surface 1b and second emitting surface 2b constitute the emitting surface 22. The first side surface 1c and second side surface 2c constitute the side surface 23. The second emitting surface 2b has a linear edge B on an opposite side of the first emitting surface 1b. This edge B is an edge for forming the cutoff line of the low beam.

In the example of FIG. 2, the light guide element 20 has a solid column shape. The light guide element 20 has a quadrangular prism shape. The incident surface 21 and emitting surface 22 have the same rectangular shape. The incident surface 21 and emitting surface 22 are flat surfaces perpendicular to the z axis. The side surface 23 has an upper surface, a lower surface, a right surface, and a left surface respectively located on the +y side, −y side, +x side, and −x side. The upper surface and lower surface have the same rectangular shape. The upper surface and lower surface are flat surfaces perpendicular to the y axis. The right surface and left surface have the same rectangular shape. The right surface and left surface are flat surfaces perpendicular to the x axis. The boundary surface A has the same rectangular shape as the upper surface and lower surface, and is a flat surface perpendicular to the y axis. The boundary surface A is located at a center of the light guide element 20 in the y axis direction. The first light guide portion 1 and second light guide portion 2 have the same quadrangular prism shape. The first incident surface 1a and second incident surface 2a have the same rectangular shape. The first emitting surface 1b and second emitting surface 2b have the same rectangular shape.

Figure 3:
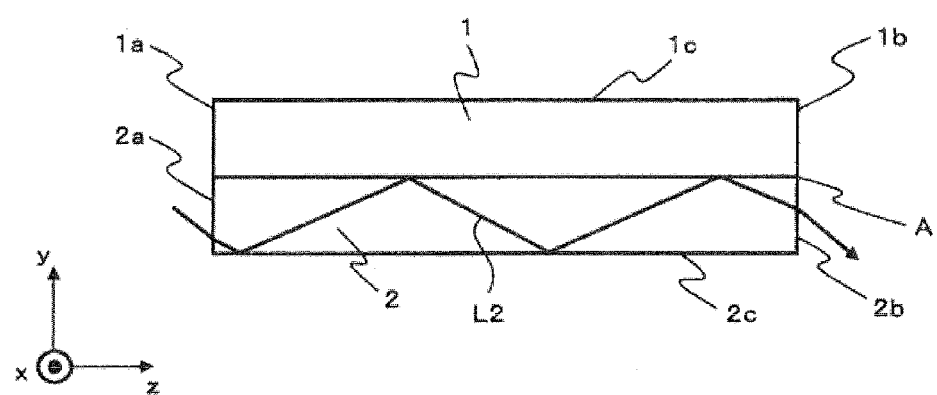
FIG. 3 is a diagram illustrating an optical path in the light guide element according to the first embodiment.

FIG. 3 illustrates an optical path L2 of light incident on the second incident surface 2a. Since the refractive index of the second light guide portion 2 is higher than the refractive index of the first light guide portion 1, the boundary surface A functions as a total reflection surface with respect to light traveling in the second light guide portion 2. The light incident on the second incident surface 2a propagates in the second light guide portion 2 while being totally reflected at the boundary surface A and the second side surface 2c, which is an interface between the second light guide portion 2 and the air, and exits from the second emitting surface 2b. Besides the optical path L2 in FIG. 3, there are also an optical path going into the first light guide portion 1 without being totally reflected at the boundary surface A, and an optical path going into the air without being totally reflected at the second side surface 2c. For example, when the incident angle on the second incident surface 2a is greater than a predetermined angle and the incident angle on the second side surface 2c is less than the total reflection angle (i.e., critical angle), it goes into the air outside the light guide element 20 without being reflected at the second side surface 2c. However, most of light incident on the second incident surface 2a from the light source 10 propagates in the second light guide portion 2 while being totally reflected and exits from the second emitting surface 2b, as illustrated in FIG. 3.

FIGS. 4(a) to 4(d) respectively illustrate optical paths L1a to L1d of light incident on the first incident surface 1a. Since the refractive index of the first light guide portion 1 is lower than the refractive index of the second light guide portion 2, the boundary surface A does not function as a total reflection surface with respect to light traveling in the first light guide portion 1. Light incident on the first incident surface 1a propagates in the first and second light guide portions 1 and 2 while being totally reflected at the first side surface 1c, which is an interface between the first light guide portion 1 and the air, and the second side surface 2c, which is an interface between the second light guide portion 2 and the air. The functions of the first and second emitting surfaces 1b and 2b vary depending on the incident angles of light on the respective surfaces.

Figure 4A:
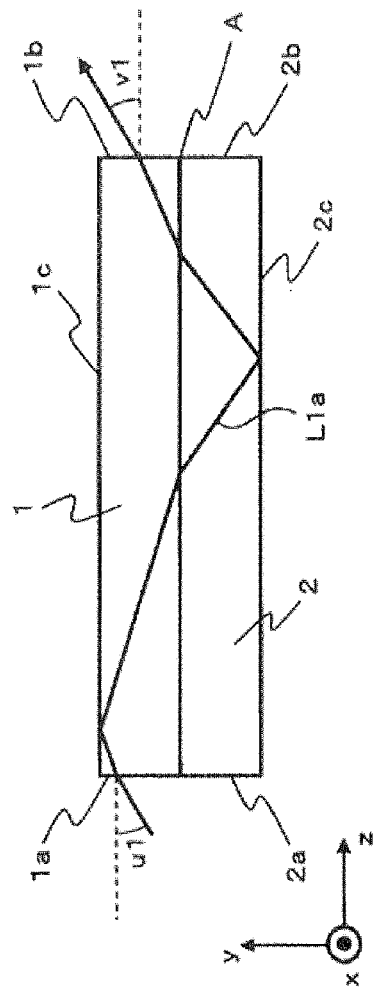

FIG. 4(a) illustrates a case where light incident on the first incident surface 1a at an incident angle u1 propagates through the first and second light guide portions 1 and 2, and is incident on the first emitting surface 1b. In this case, the light incident on the first emitting surface 1b exits from the first emitting surface 1b at an emission angle v1 equal to the incident angle u1 on the first incident surface 1a. Since this light exits from the first emitting surface 1b, it contributes the luminous intensity of the first emitting surface 1b.

Figure 4B:
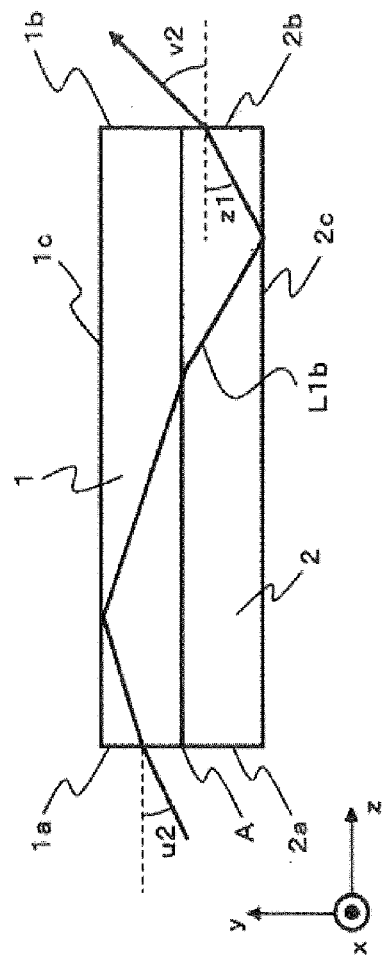

FIG. 4(b) illustrates a case where light incident on the first incident surface 1a at an incident angle u2 propagates through the first and second light guide portions 1 and 2, and is incident on the second emitting surface 2b at an incident angle z1 less than the total reflection angle. In this case, the light incident on the second emitting surface 2b exits from the second emitting surface 2b at an emission angle v2 greater than the incident angle u2 on the first incident surface 1a. Since this light exits from the second emitting surface 2b, it does not contribute the luminous intensity of the first emitting surface 1b.

FIG. 4(c) illustrates a case where light incident on the first incident surface 1a at an incident angle u3 propagates through the first and second light guide portions 1 and 2, and is incident on the second emitting surface 2b at an incident angle z2 greater than the total reflection angle. In FIG. 4(c), the light incident on the second emitting surface 2b is totally reflected at the second emitting surface 2b to return to the incident surface side, and exits from the first incident surface 1a at an emission angle v3 equal to the incident angle u3. Since this light exits from the first incident surface 1a, it does not contribute the luminous intensity of the first emitting surface 1b.

FIG. 4(d) illustrates a case where light incident on the first incident surface 1a at an incident angle u4 propagates through the first and second light guide portions 1 and 2, and is incident on the second emitting surface 2b at an incident angle z3 greater than the total reflection angle. In FIG. 4(d), the light incident on the second emitting surface 2b is totally reflected at the second emitting surface 2b to return to the incident surface side, is totally reflected again at the second incident surface 2a, propagates toward the emitting surface side, and is incident on the first emitting surface 1b. The light incident on the first emitting surface 1b exits from the first emitting surface 1b at an emission angle v4 equal to the incident angle u4 on the first incident surface 1a. Since this light exits from the first emitting surface 1b, it contributes the luminous intensity of the first emitting surface 1b. However, if there is internal absorption in the light guide portions, as compared to the case of FIG. 4(a), the increase in optical path length increases the light loss due to the internal absorption in the light guide portions, so that the contribution to the luminous intensity of the first emitting surface 1b is small.

Paths of travel of light propagating in the light guide element 20 are roughly divided into the above-described patterns. However, the optical path length and the number of total reflections of light propagating through the first and second light guide portions 1 and 2 vary depending on the sizes of the first and second incident surfaces 1a and 2a, the sizes of the first and second emitting surfaces 1b and 2b, the length of the light guide element 20 in the z axis direction, or the like.

As above, the refractive index of the second light guide portion 2 is higher than the refractive index of the first light guide portion 1, so that the boundary surface A functions as a total reflection surface with respect to light in the second light guide portion 2 but does not function as a total reflection surface with respect to light in the first light guide portion 1. Thus, while most of light incident on the second incident surface 2a exits from the second emitting surface 2b, light incident on the first incident surface 1a divides into light exiting from the first emitting surface 1b, light exiting from the second emitting surface 2b, light exiting from the first incident surface 1a, and the like. Therefore, the proportion of the light contributing the luminous intensity of the first emitting surface 1b to the light incident on the first incident surface 1a is less than the proportion of the light contributing the luminous intensity of the second emitting surface 2b to the light incident on the second incident surface 2a. Thus, by providing the first light guide portion 1 and second light guide portion 2 with different refractive indexes, it is possible to provide a difference in luminous intensity between the first emitting surface 1b and the second emitting surface 2b.

Figure 5:
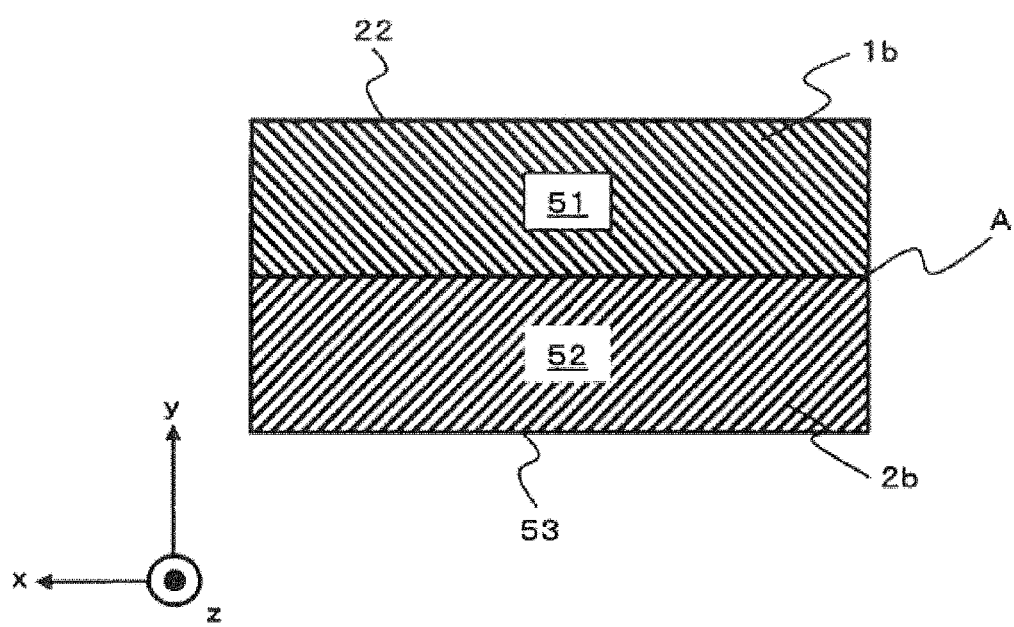
FIG. 5 is a diagram illustrating light emitting regions in an emitting surface of the light guide element according to the first embodiment.

FIG. 5 is a diagram conceptually illustrating a luminous intensity distribution of the emitting surface 22. As illustrated in FIG. 5, with the boundary surface A as a boundary, a first light emitting region 51 is formed in the first emitting surface 1b corresponding to the first light guide portion 1 of the emitting surface 22, and a second light emitting region 52 is formed in the second emitting surface 2b corresponding to the second light guide portion 2 of the emitting surface 22. A linear light/dark boundary 53 is formed by the edge B of the second emitting surface 2b at the lower end of the second light emitting region 52. The luminous intensity distribution in each light emitting region depends on the intensity distribution of light incident on each light guide portion, the dimensions of each light guide portion, and the like. The intensity distribution of light incident on each light guide portion is, specifically, a relationship between the incident position and incident angle on the incident surface of each light guide portion and the intensity of the incident light. The larger the lengths of the first light guide portion 1 and second light guide portion 2 in the z axis direction, the more uniform the luminous intensity distribution in each light emitting region.

The ratio Lu2/Lu1 of the luminous intensity Lu2 of the second light emitting region 52 to the luminous intensity Lu1 of the first light emitting region 51 can be changed by changing the ratio between the amount of light incident on the first incident surface 1a and the amount of light incident on the second incident surface 2a.

Figure 6A:
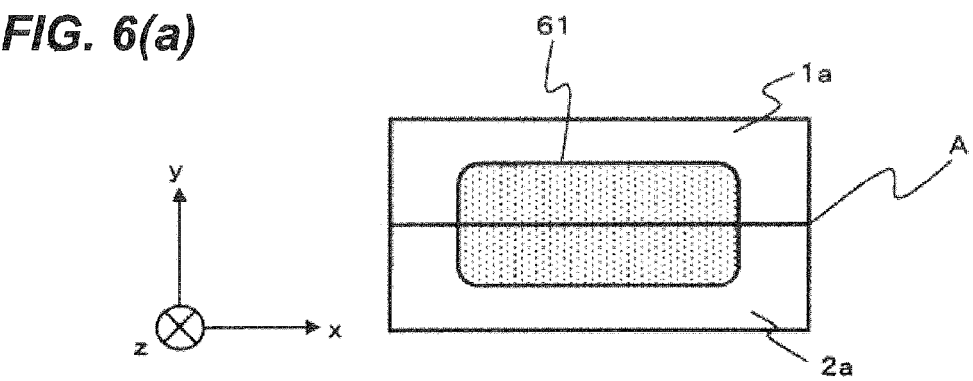
FIGS. 6(a) to 6(c) are diagrams illustrating relationships between an incident surface of the light guide element according to the first embodiment and a light incident region.
Figure 6B:
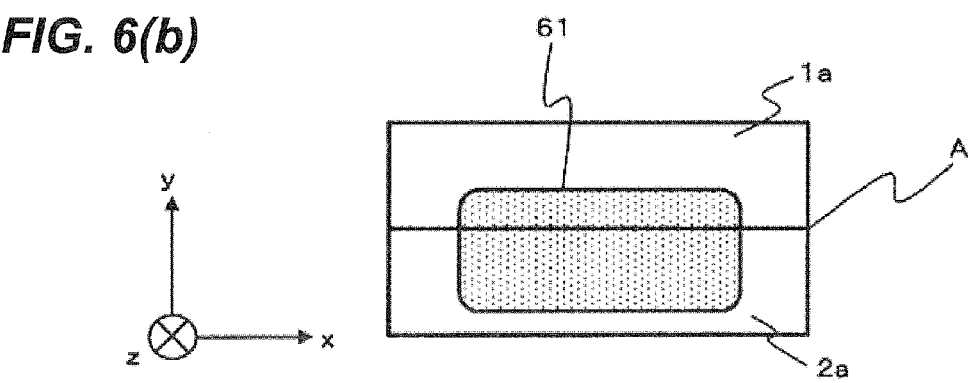
Figure 6C:
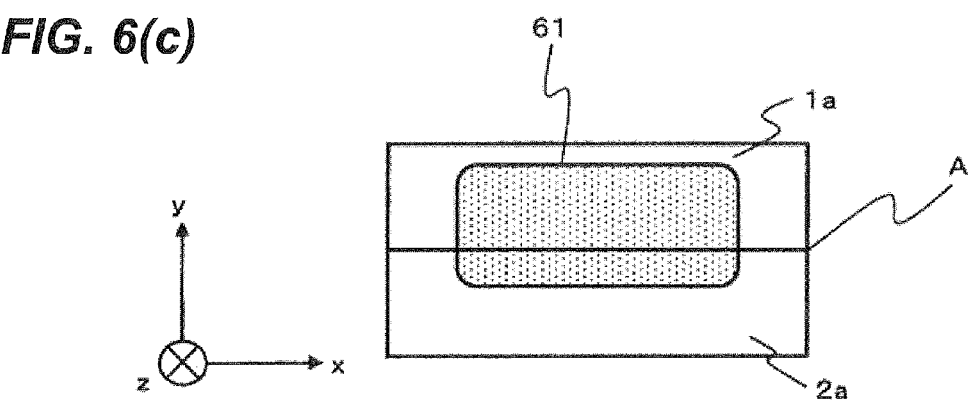

FIGS. 6(a) to 6(c) illustrate relationships between the first incident surface 1a and second incident surface 2a and an incident region 61 of the light from the light source 10.

In FIG. 6(a), the incident region 61 is arranged so that the amount of light incident on the first incident surface 1a is equal to the amount of light incident on the second incident surface 2a. For example, the light source 10 is arranged at the same position as the boundary surface A in the y axis direction. In this case, for the above-described reason, the luminous intensity of the second light emitting region 52 is higher than the luminous intensity of the first light emitting region 51. That is, (Lu2/Lu1)>1 is satisfied.

In FIG. 6(b), the incident region 61 is arranged so that the amount of light incident on the second incident surface 2a is greater than the amount of light incident on the first incident surface 1a. For example, the light source 10 is displaced from the boundary surface A toward the second incident surface 2a (−y direction) in the y axis direction. In this case, the ratio Lu2/Lu1 of the luminous intensity Lu2 of the second light emitting region 52 to the luminous intensity Lu1 of the first light emitting region 51 is large as compared to FIG. 6(a).

In FIG. 6(c), the incident region 61 is arranged so that the amount of light incident on the first incident surface 1a is greater than the amount of light incident on the second incident surface 2a. For example, the light source 10 is displaced from the boundary surface A toward the first incident surface 1a (+y direction) in the y axis direction. In this case, the ratio Lu2/Lu1 of the luminous intensity Lu2 of the second light emitting region 52 to the luminous intensity Lu1 of the first light emitting region 51 is small as compared to FIG. 6(a).

In this manner, by guiding the light from the light source 10 by the light guide element 20, it is possible to form light emitting regions different in luminous intensity or brightness in the emitting surface 22. For example, the first light emitting region 51 and the second light emitting region 52 brighter than the first light emitting region 51 are formed in the emitting surface 22.

Referring again to FIG. 1, the radiation optical system 30 radiates the light emitted from the emitting surface 22 of the light guide element 20 ahead of the vehicle. "Radiate" refers to throwing light, and is interchangeable with "project." The radiation optical system 30 magnifies and projects an image on the emitting surface 22 onto the irradiated surface S in front of the vehicle. The radiation optical system 30 has positive power as a whole. The radiation optical system 30 can be constituted by one or more lenses, one or more mirrors, or a combination thereof, for example. However, since the light use efficiency decreases as the number of lenses increases, the radiation optical system 30 is desirably constituted by one or two lenses. The lenses are formed of, for example, refractive material having transparency, such as transparent plastic.

The irradiated surface S is set at a predetermined position in front of the vehicle. The predetermined position in front of the vehicle is a position at which the luminous intensity or illuminance of the vehicle headlight is measured, and is specified in road traffic rules or the like. For example, in Europe, United Nations Economic Commission for Europe (UNECE) specifies a position 25 m from a light source as the position at which the luminous intensity of an automobile headlight is measured. In Japan, Japanese Industrial Standards Committee (JIS) specifies a position 10 m from a light source as the position at which the luminous intensity is measured. "Illuminance" refers to a value indicating the luminous flux incident per unit time on unit area of a surface illuminated by lighting.

Figure 7A:
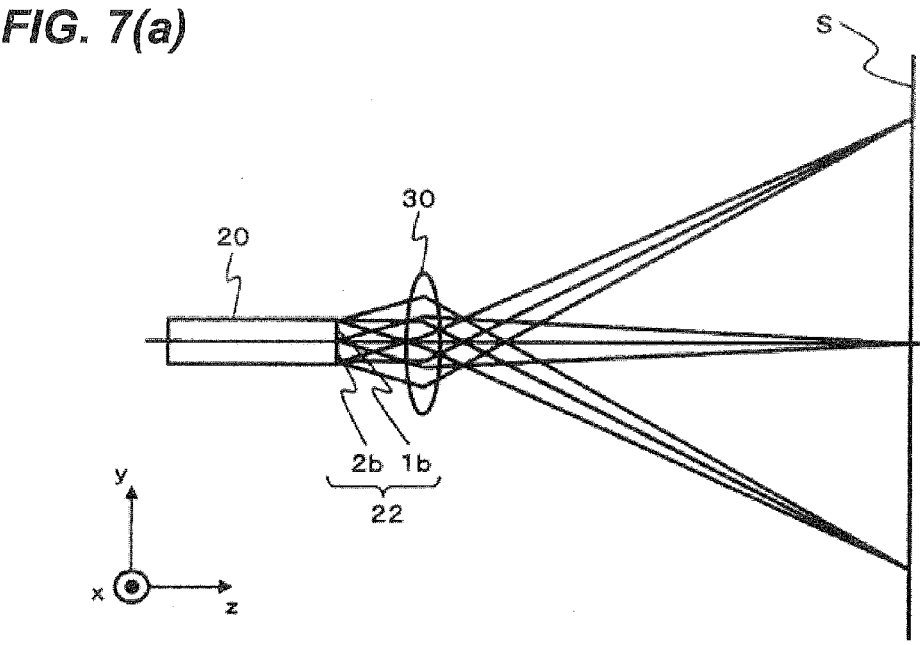
FIGS. 7(a) and 7(b) are explanatory diagrams of functions of a radiation optical system according to the first embodiment.
Figure 7B:
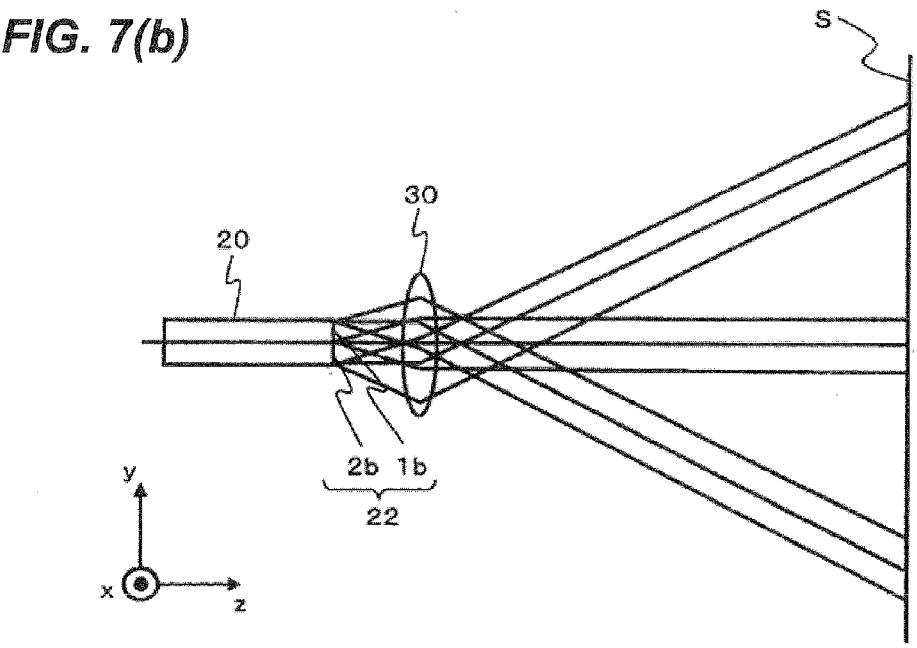

FIGS. 7(a) and 7(b) are diagrams illustrating functions of the radiation optical system 30. In FIG. 7(a), an inverted image of the emitting surface 22 is imaged on the irradiated surface S by the radiation optical system 30. Thus, the illuminance distribution on the irradiated surface S is a distribution corresponding to the luminous intensity distribution on the emitting surface 22. To prevent a difference in illuminance caused by the boundary surface A from being noticeable on the irradiated surface S, the radiation optical system 30 may be configured so that imaging spots of the entire region or in the vicinity of the boundary surface A are large. In FIG. 7(b), light emitted from one point on the emitting surface 22 is substantially collimated (i.e., converted into substantially parallel light) by the radiation optical system 30. In this case, it is possible to reduce change in the illuminance distribution on the irradiated surface S due to change in the distance to the irradiated surface S.

Figure 8:
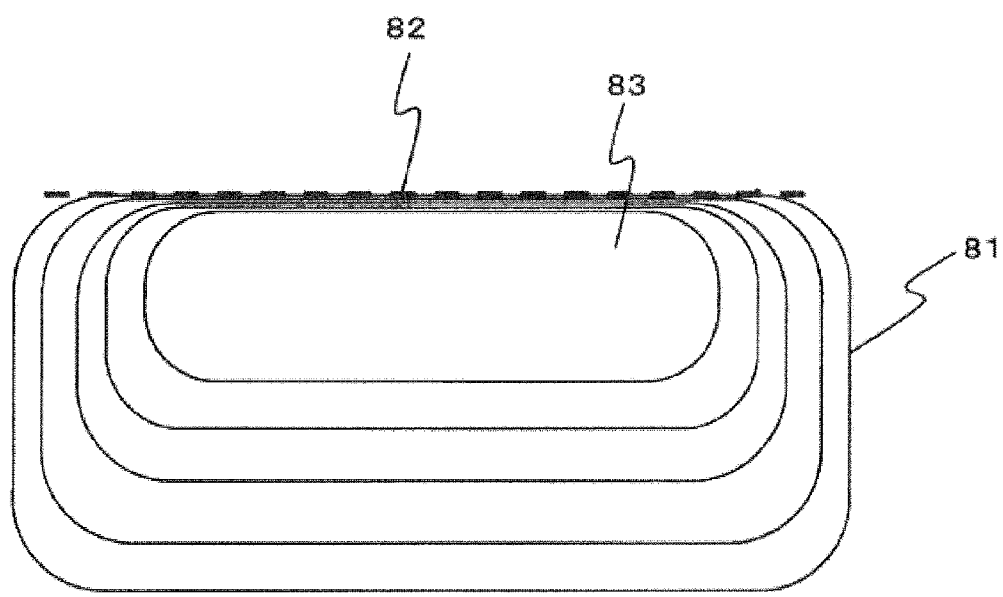
FIG. 8 is an explanatory diagram of an irradiated region and an illuminance distribution of the vehicle headlight device according to the first embodiment.

FIG. 8 illustrates, in contour display, an example of the illuminance distribution in an irradiated region 81 on the irradiated surface S. "Contour display" refers to displaying by means of a contour plot. "Contour plot" refers to a diagram depicting a line joining points of equal value. The irradiated region 81 is an area irradiated with the light from the radiation optical system 30, in the irradiated surface S. The shape of the irradiated region 81 is substantially similar to the shape of the emitting surface 22 of the light guide element 20. The multiple solid lines in the irradiated region 81 each represent a contour line indicating the same luminous intensity. A linear cutoff line 82 is formed at the upper end of the irradiated region 81, corresponding to the linear light/dark boundary 53 in FIG. 5. Also, a high illuminance region 83 higher in illuminance than the other region is formed near and below (the −y side) the cutoff line 82, corresponding to the fact that the luminous intensity of the second light emitting region 52 is higher than the luminous intensity of the first light emitting region 51 in FIG. 5. In this manner, it is possible to illuminate an area in front of the driver particularly brightly and form a sharp cutoff line at the upper edge of the irradiated region 81 while using a small light guide element.

Figure 9A:
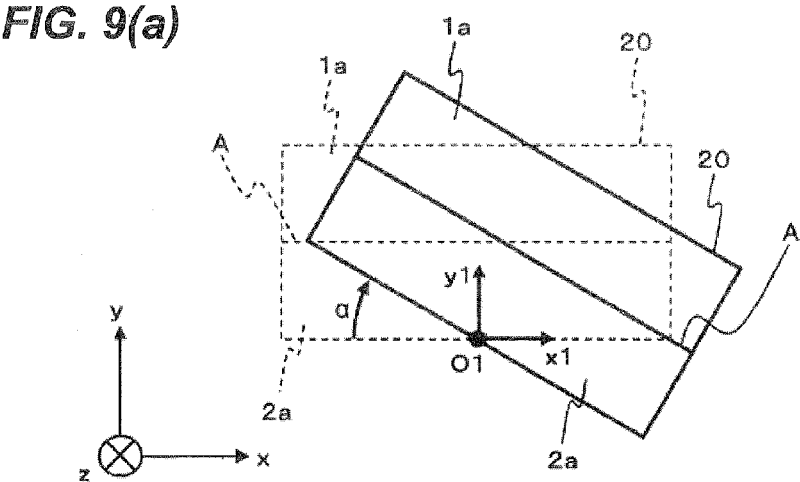
FIGS. 9(a) and 9(b) are diagrams illustrating change in the irradiated region caused by rotation of the light guide element according to the first embodiment.
Figure 9B:
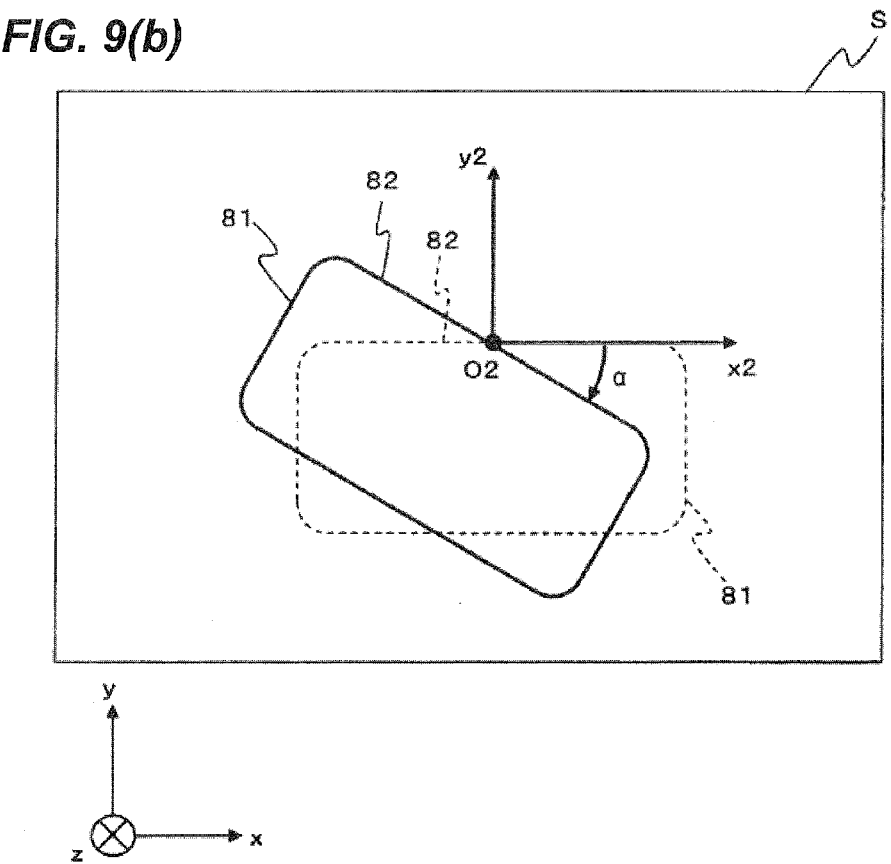

FIGS. 9(a) and 9(b) illustrate change in the irradiated region 81 on the irradiated surface S in accordance with rotation of the light guide element 20.

FIG. 9(a) illustrates positions of the light guide element 20 before and after rotation thereof. In FIG. 9(a), the x1 axis is defined to be parallel to a horizontal direction, the y1 axis is defined to be parallel to a vertical direction, and the origin O1 is defined at the midpoint of the line of intersection between the surface (i.e., lower surface) on the −y side of the light guide element 20 facing the boundary surface A and the second incident surface 2a. The light guide element 20 is rotatable about a rotational axis that passes through the origin O1 and is parallel to the z axis. The dashed line indicates the light guide element 20 before the rotation, and the solid line indicates the light guide element 20 after the rotation. The light guide element 20 is rotated by an angle α clockwise in the drawing.

FIG. 9(b) illustrates positions of the irradiated region 81 corresponding to the light guide element 20 before and after the rotation. In FIG. 9(b), the x2 axis is defined to be parallel to the horizontal direction, the y2 axis is defined to be parallel to the vertical direction, and the origin O2 is defined at a point conjugate to the origin O1 with respect to the radiation optical system 30. The dashed line indicates the irradiated region 81 corresponding to the light guide element 20 before the rotation, and the solid line indicates the irradiated region 81 corresponding to the light guide element 20 after the rotation. The irradiated region 81 is rotated by an angle α clockwise in the drawing. That is, the irradiated region 81 is rotated by the same rotation angle as the light guide element 20 in the same rotation direction as the light guide element 20.

For example, when the vehicle body of the motorcycle is horizontal and the rotational position of the light guide element 20 relative to the vehicle body is at an initial position, the light guide element 20 is at the position indicated by the dashed line in FIG. 9(a), the irradiated region 81 is formed at the position indicated by the dashed line in FIG. 9(b), and the cutoff line 82 coincides with the x2 axis and is horizontal. When the light guide element 20 rotates from the initial position by the angle α relative to the vehicle body to move to the position indicated by the solid line in FIG. 9(a), the irradiated region 81 also rotates in the same direction as the light guide element 20 by the same angle α as the light guide element 20 to move to the position indicated by the solid line in FIG. 9(b). In this manner, by rotating the light guide element 20 relative to the vehicle body, it is possible to rotate the irradiated region 81.

Typically, when the vehicle body tilts during cornering, the headlight device 100 tilts together with the vehicle body. Thus, an area in a heading direction toward which the driver's gaze is directed may not be sufficiently illuminated. The area in the heading direction is, for example, a corner area during cornering.

Figure 10:
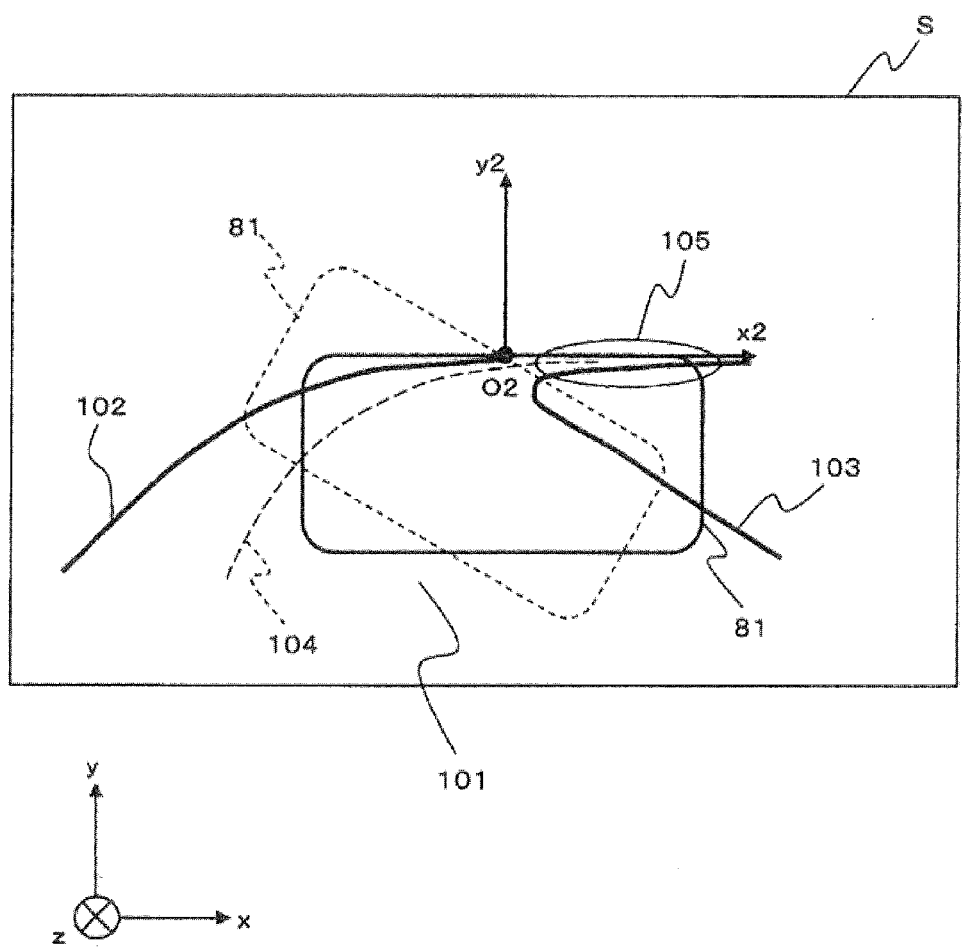
FIG. 10 is a diagram illustrating the irradiated region when a vehicle body equipped with the vehicle headlight device according to the first embodiment is tilted.

FIG. 10 illustrates a relationship between the irradiated region 81 and a road 101 when the vehicle body equipped with the headlight device 100 is tilted. In FIG. 10, there is a center line 104 between a left edge 102 and a right edge 103 of the road 101, and the motorcycle is traveling between the center line 104 and the right edge 103. The motorcycle is also traveling in a right hand corner while tilting the vehicle body to the right. When the vehicle body of the motorcycle rotates clockwise from a horizontal position in an x2-y2 plane, the entire headlight device 100 including the light guide element 20 also rotates clockwise in the same manner, and therefore the irradiated region 81 also rotates clockwise in the same manner. The irradiated region 81 at this time is indicated by a dashed line in FIG. 10. With the irradiated region 81 indicated by this dashed line, it is not possible to properly illuminate an area 105 in a heading direction. In this case, by rotating the light guide element 20 in a direction opposite to that of the rotation of the vehicle body by the same angle as that of the rotation of the vehicle body to rotate the irradiated region 81 in a direction opposite to that of the rotation of the vehicle body by the same angle as that of the rotation of the vehicle body, it is possible to cancel the rotation of the irradiated region 81 due to the rotation of the vehicle body and properly illuminate the area 105 in the heading direction. The irradiated region 81 after the rotation of the light guide element 20 is indicated by a solid line in FIG. 10.

As described above, by rotating only the light guide element 20, which is small in size among the elements of the headlight device 100, it is possible to properly illuminate an area in the traveling direction even if the vehicle body of the motorcycle is rotated. The rotation of the light guide element 20 can be implemented by a drive unit for rotating the light guide element 20. An example of this drive unit will be described later in a third embodiment.

Figure 11A:
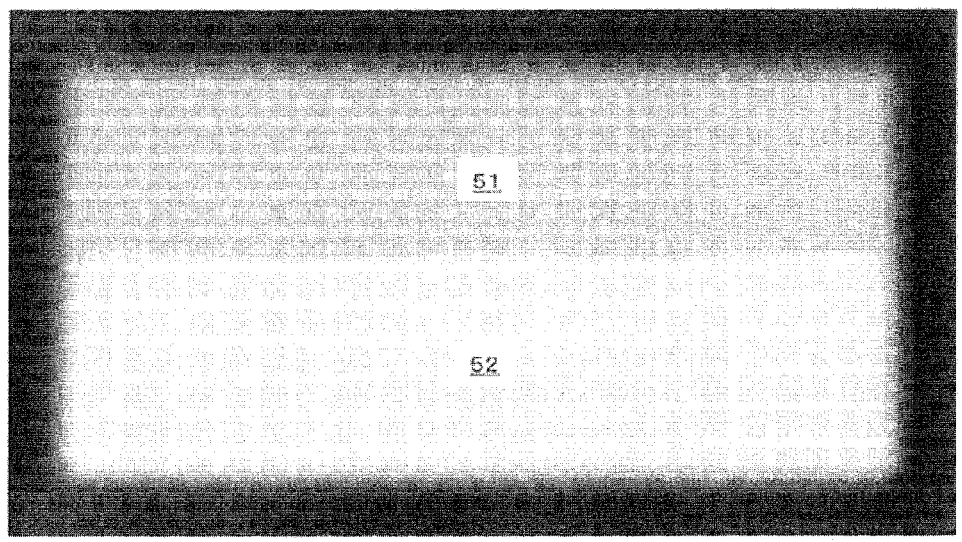
FIGS. 11(a) and 11(b) are drawings illustrating an example of simulation results of a luminous intensity distribution on the emitting surface of the light guide element according to the first embodiment.
Figure 11B:
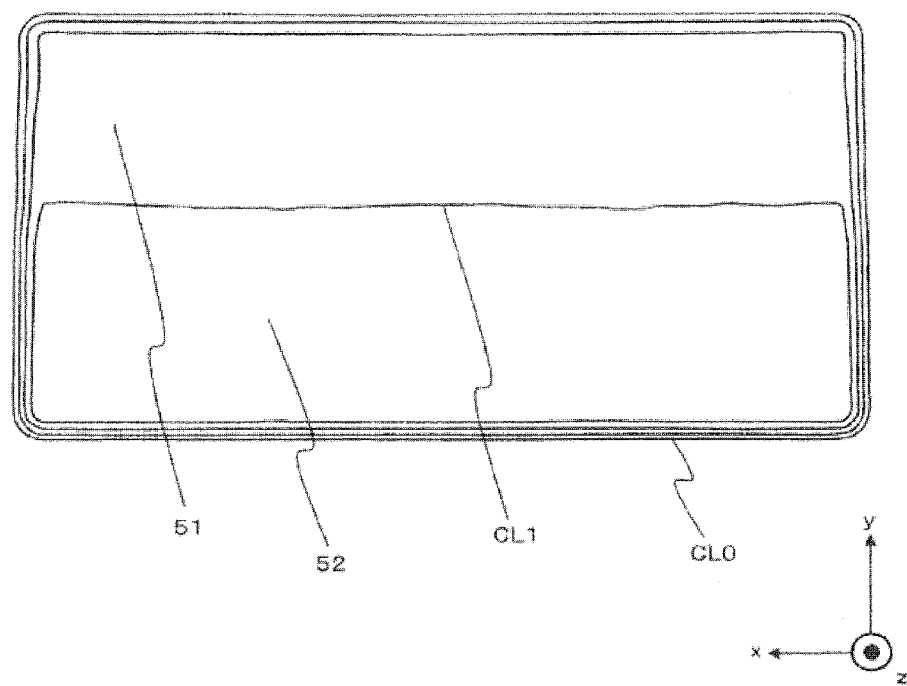

FIGS. 11(a) and 11(b) illustrate, respectively in gradation display and in contour display, an example of simulation results of the luminous intensity distribution on the emitting surface 22 of the light guide element 20. In FIG. 11(a), the magnitude of the luminous intensity is represented in light/dark gradation and is represented more brightly as the luminous intensity is greater. The same applies to FIGS. 14(a), 16(a) and 20(a) described later. In FIG. 11(b), each contour line indicates a luminous intensity level higher than zero. Of the multiple contour lines, the innermost contour line CL1 indicates the highest level, the contour lines outside the contour line CL1 indicate lower levels as they are farther away from the contour line CL1, and the outermost contour line CL0 indicates the lowest level. The luminous intensity of the region outside the contour line CL0 is lower than the level of the contour line CL0 and is substantially zero. The same applies to FIGS. 14(b), 16(b), and 20(b) described later. Conditions for the simulation of FIGS. 11(a) and 11(b) are as follows. The first light guide portion 1 and second light guide portion 2 are made of different optical materials having different refractive indexes. The refractive index of the first light guide portion 1 is 1.5168, and the refractive index of the second light guide portion is 1.80518. The light source 10 and incident region 61 are arranged so that the amount of light incident on the first incident surface 1a is equal to the amount of light incident on the second incident surface 2a, as illustrated in FIG. 6(a).

FIGS. 11(a) and 11(b) show that the second light emitting region 52 on the −y side is higher in luminous intensity than the first light emitting region 51 on the +y side.

Figure 12A:
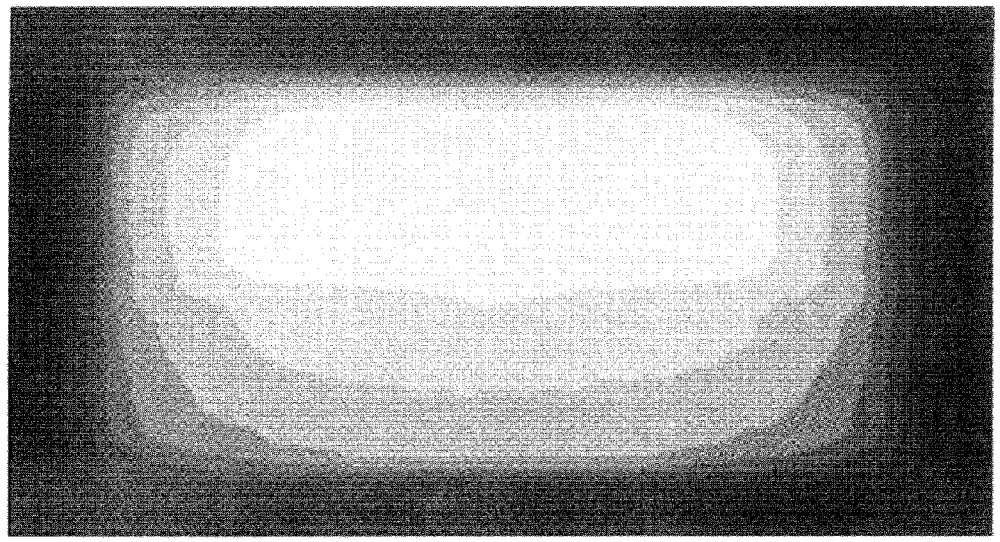
FIGS. 12(a) and 12(b) are drawings illustrating an example of simulation results of an illuminance distribution on an irradiated surface of the vehicle headlight device according to the first embodiment.
Figure 12B:
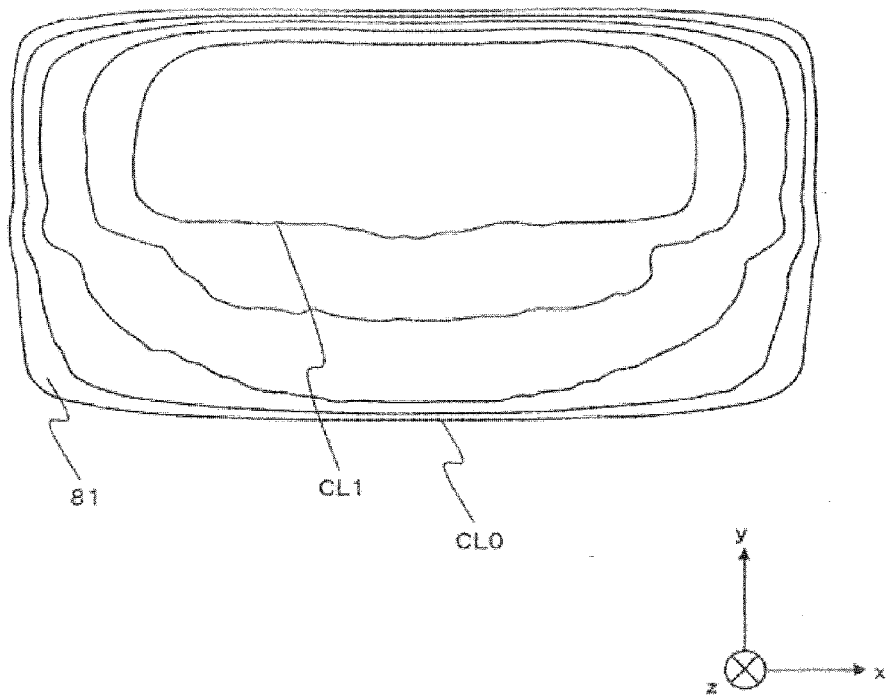

FIGS. 12(a) and 12(b) illustrate, respectively in gradation display and in contour display, an example of simulation results of the illuminance distribution on the irradiated surface S. In FIG. 12(a), the magnitude of the illuminance is represented in light/dark gradation and is represented more brightly as the illuminance is greater. The same applies to FIG. 13(a) described later. In FIG. 12(b), each contour line indicates an illuminance level higher than zero. Of the multiple contour lines, the innermost contour line CL1 indicates the highest level, the contour lines outside the contour line CL1 indicate lower levels as they are farther away from the contour line CL1, and the outermost contour line CL0 indicates the lowest level. The illuminance of the region outside the contour line CL0 is lower than the level of the contour line CL0 and is substantially zero. The same applies to FIG. 13(b) described later. FIGS. 12(a) and 12(b) illustrate the illuminance distribution on the irradiated surface S when the emitting surface 22 of the light guide element 20 has the luminous intensity distribution illustrated in FIGS. 11(a) and 11(b). Since an inverted image of the emitting surface 22 is imaged on the irradiated surface S by the radiation optical system 30, an illuminance distribution similar to a luminous intensity distribution obtained by inverting the luminous intensity distribution on the emitting surface 22 is formed on the irradiated surface S, and a portion on the upper side (+y side) of the irradiated region 81 is higher in illuminance than a portion on the lower side (−y side) of the irradiated region 81. A sharp cutoff line is formed at the upper edge of the irradiated region 81, and the illuminance is highest near and below the cutoff line. In this manner, it is possible to illuminate an area in front of the driver particularly brightly and form a sharp cutoff line at the upper edge of the irradiated region 81 while using a small light guide element.

Figure 13A:
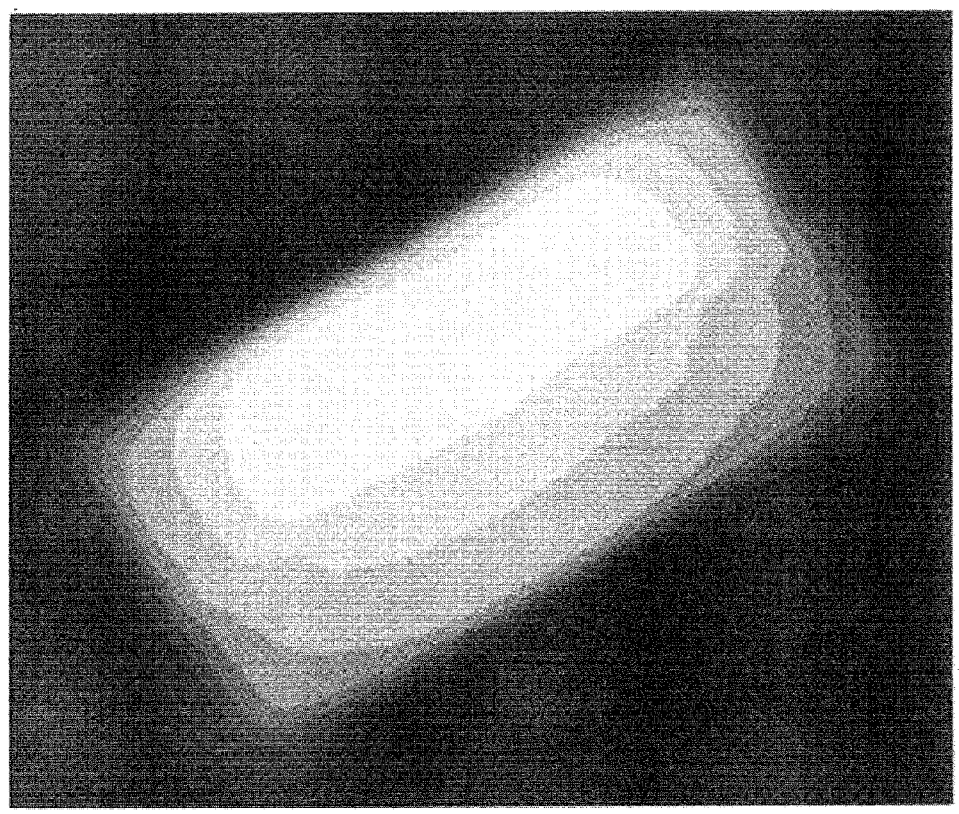
FIGS. 13(a) and 13(b) are drawings illustrating an example of simulation results of the illuminance distribution on the irradiated surface of the vehicle headlight device according to the first embodiment.
Figure 13B:
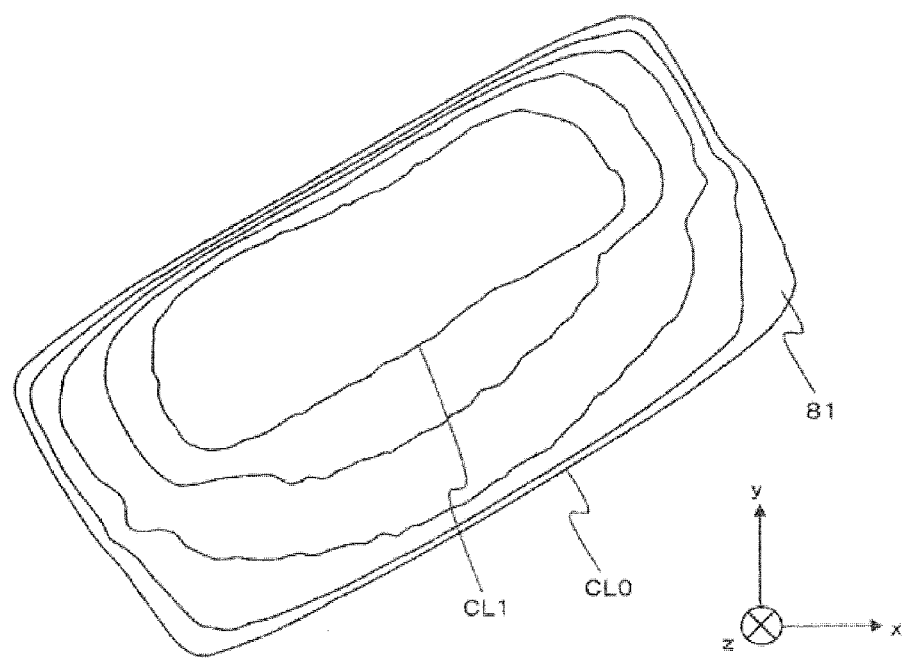

FIGS. 13(a) and 13(b) illustrate, respectively in gradation display and in contour display, the illuminance distribution on the irradiated surface S when only the light guide element 20 is rotated by 30° about the z axis from the position of FIGS. 12(a) and 12(b). The irradiated region 81 is rotated with the rotation of the light guide element 20. However, the shape of the irradiated region 81 and the pattern of the illuminance distribution are similar to those of FIGS. 12(a) and 12(b). This shows that even if the vehicle body of the motorcycle rotates, by rotating only the light guide element 20, it is possible to cancel the rotation of the irradiated region 81 due to the rotation of the vehicle body and properly illuminate an area in the traveling direction of the vehicle.

Figure 14A:
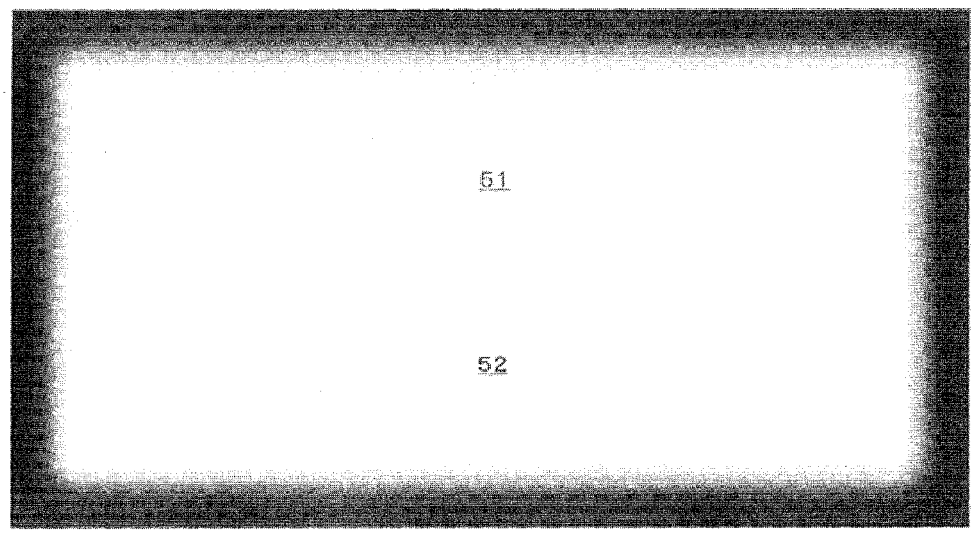
FIGS. 14(a) and 14(b) are drawings illustrating another example of simulation results of the luminous intensity distribution on the emitting surface of the light guide element according to the first embodiment.
Figure 14B:
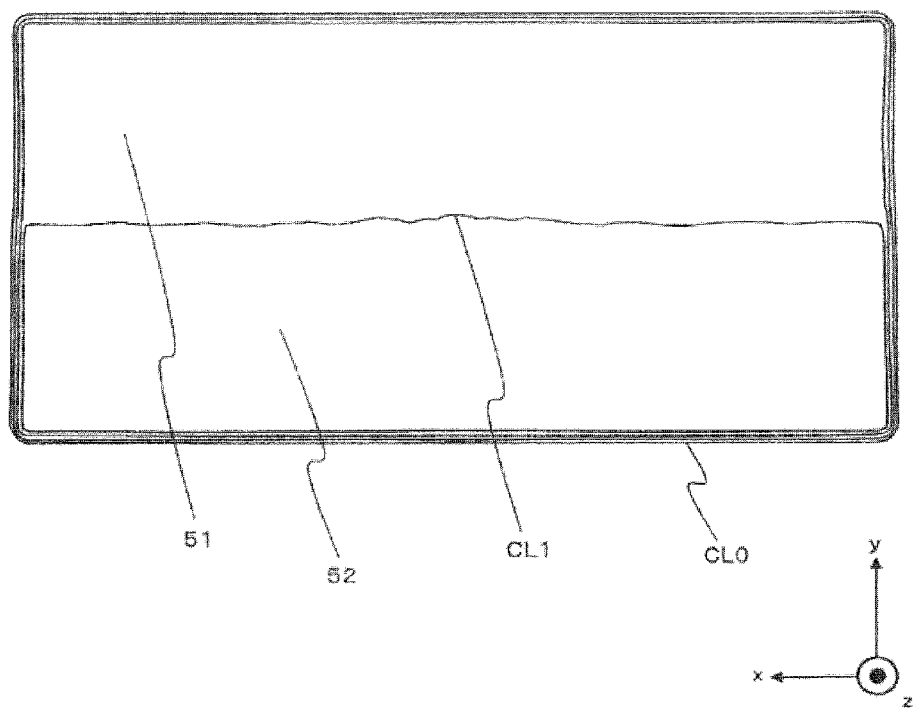

FIGS. 14(a) and 14(b) illustrate, respectively in gradation display and in contour display, another example of simulation results of the luminous intensity distribution on the emitting surface 22 of the light guide element 20. In this example, the refractive index of the second light guide portion 2 is 1.60311. That is, the refractive index of the second light guide portion 2 is smaller than in the case of FIGS. 11(a) and 11(b). The other conditions are the same as in the case of FIGS. 11(a) and 11(b). It can be seen that the second light emitting region 52 on the −y side is higher in luminous intensity than the first light emitting region 51 on the +y side. However, it can be seen that in FIG. 14(a), the light/dark difference between the first light emitting region 51 and the second light emitting region 52 is smaller than in the case of FIG. 11(a), and the difference in luminous intensity between the first light emitting region 51 and the second light emitting region 52 is smaller than in the case of FIG. 11(a). The level difference between the contour line CL1 and the contour lines outside it in FIG. 14(b) is smaller than in the case of FIG. 11(b). In this manner, the light emitting region 52 corresponding to the second light guide portion 2 having the high refractive index is higher in luminous intensity than the light emitting region 51 corresponding to the first light guide portion 1 having the low refractive index; the greater the difference in refractive index between the first light guide portion 1 and the second light guide portion 2, the greater the obtained difference in luminous intensity. Thus, by appropriately setting the refractive indexes of the first and second light guide portions 1 and 2, it is possible to obtain a desired luminous intensity distribution on the emitting surface 22.

Modifications

Figure 15:
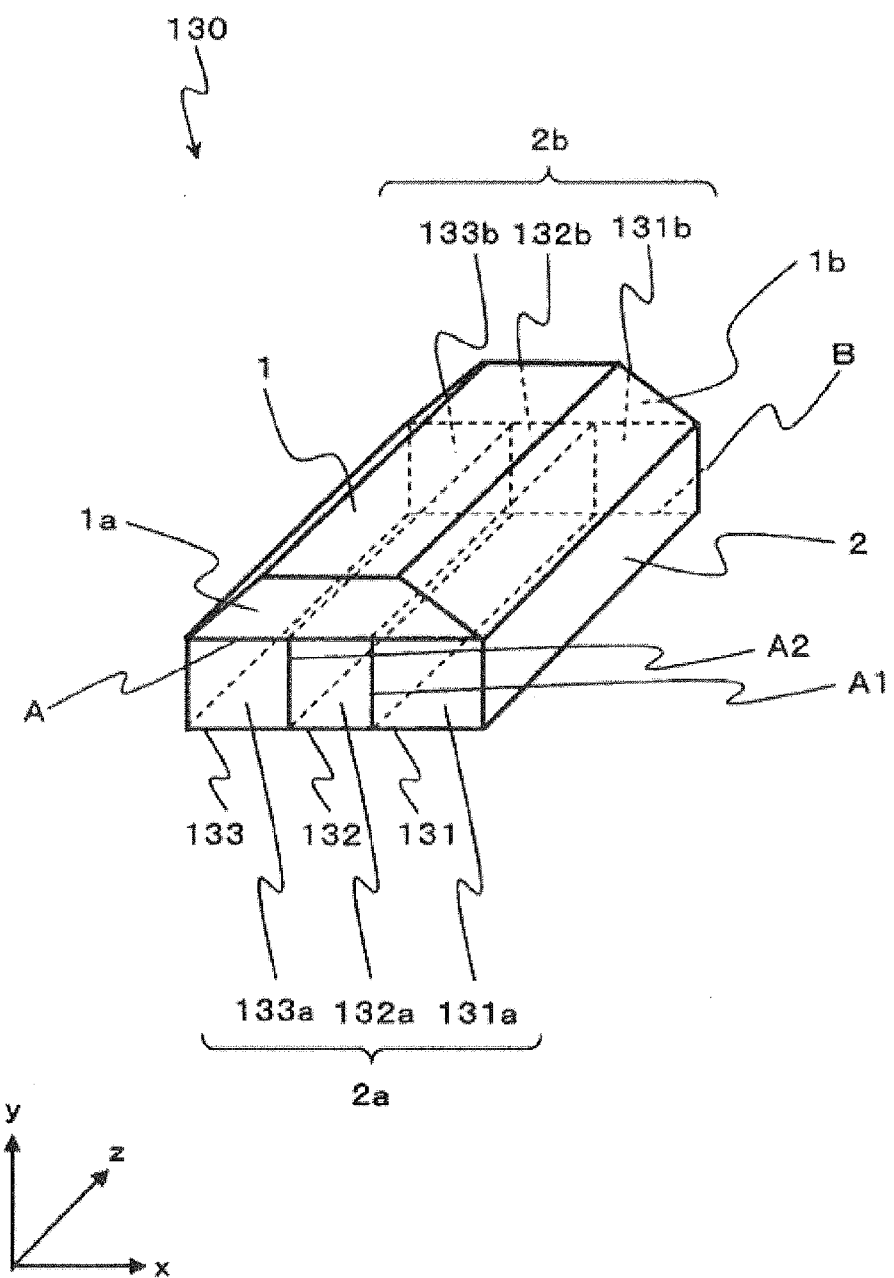
FIG. 15 is a perspective view schematically illustrating a configuration of a light guide element of a modification example of the first embodiment.

FIG. 15 is a perspective view of a light guide element 130 of a modification example of the first embodiment. In this modification example, the first light guide portion 1 has the first incident surface 1a facing the light source 10 and the first emitting surface 1b opposing the first incident surface 1a. The second light guide portion 2 has sub light guide portions 131, 132, and 133. The sub light guide portions 131, 132, and 133 have incident surfaces 131a, 132a, and 133a facing the light source 10, and emitting surfaces 131b, 132b, and 133b opposing the incident surfaces 131a, 132a, and 133a, respectively. The incident surfaces 131a, 132a, and 133a constitute the second incident surface 2a, and the emitting surfaces 131b, 132b, and 133b constitute the second emitting surface 2b. The sub light guide portion 131 and sub light guide portion 132 are in contact with each other at a boundary surface A1; the sub light guide portion 132 and sub light guide portion 133 are in contact with each other at a boundary surface A2. All of the sub light guide portions 131, 132, and 133 are in contact with the first light guide portion 1 at the boundary surface A. The first incident surface 1a, the first emitting surface 1b, and the cross-section of the first light guide portion 1 in an x-y plane have a trapezoidal shape. When the refractive indexes of the sub light guide portions 131, 132, and 133 and the first light guide portion 1 are respectively denoted by n131, n132, n133, and n1, n132>n131=n133>n1 is satisfied.

Figure 16A:
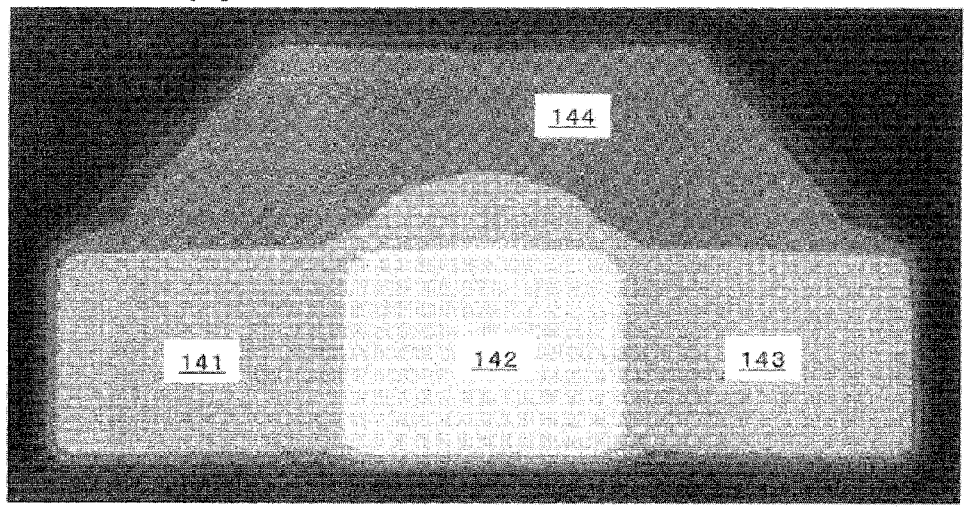
FIGS. 16(a) and 16(b) are drawings illustrating an example of simulation results of a luminous intensity distribution on an emitting surface of the light guide element of the modification example of the first embodiment.
Figure 16B:
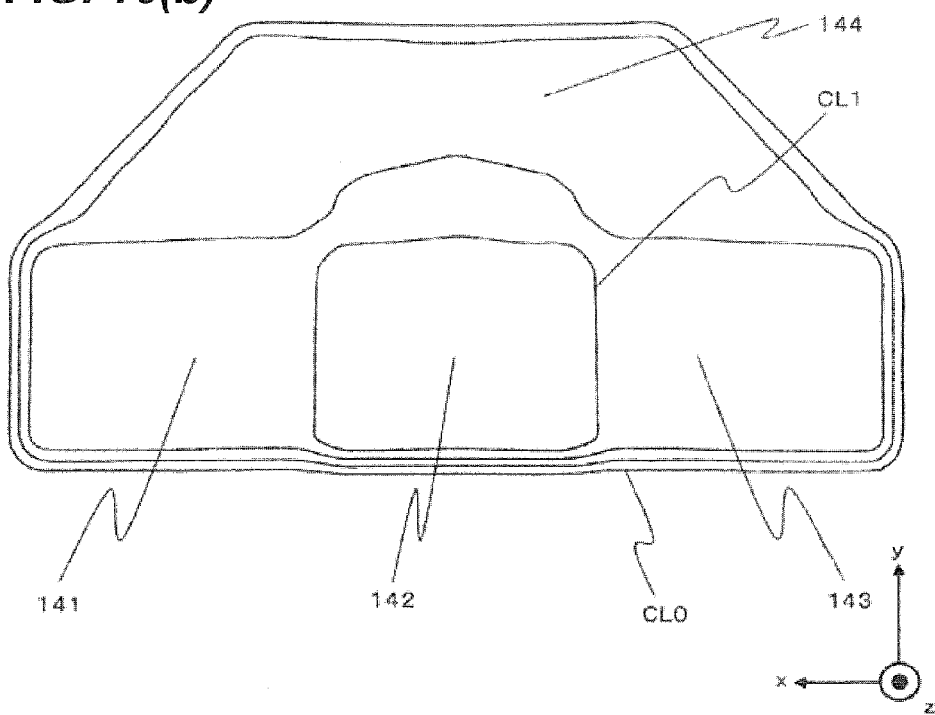

FIGS. 16(a) and 16(b) illustrate, respectively in gradation display and in contour display, an example of simulation results of the luminous intensity distribution on the emitting surface 22 of the light guide element 130 of the modification example. Conditions for the simulation are as follows. Each of the first light guide portion 1 and sub light guide portions 131, 132, and 133 is a glass rod. The refractive index of the first light guide portion 1 is 1.5168; the refractive indexes of the sub light guide portions 131 and 133 are 1.83400; the refractive index of the sub light guide portion 132 is 1.84666. The light source 10 is arranged in the same manner as FIG. 6(a).

Referring to FIGS. 16(a) and 16(b), the luminous intensity of a sub light emitting region 142 corresponding to the emitting surface 132b of the sub light guide portion 132 is the highest; subsequently, the luminous intensities of sub light emitting regions 141 and 143 corresponding to the emitting surfaces 131b and 133b of the sub light guide portions 131 and 133 are high; the luminous intensity in a first light emitting region 144 corresponding to the first emitting surface 1b of the first light guide portion 1 is the lowest. Light guide portions having higher refractive indexes have higher luminous intensities on their emitting surfaces. This configuration makes it possible to illuminate an area in front of the driver more brightly. Further, the emitting surface 1b of the first light guide portion 1 has a trapezoidal shape, which makes it possible to prevent unnecessary illumination of a peripheral region.

The following advantages (1) to (5) are obtained from this embodiment described above.

(1) With the headlight device according to this embodiment, it is possible to obtain, with a small configuration, a desired light distribution pattern. Specifically, by using a light guide element that guides light incident on an incident surface from a light source to emit it from an emitting surface, it is possible to form a light/dark boundary in the light distribution pattern by an edge portion of the emitting surface of the light guide element. Further, with a configuration in which the light from the light source is guided by light guide portions having different refractive indexes, it is possible to form light emitting regions having different brightness on the emitting surface of the light guide element and form a region brighter than the other region in the light distribution pattern. More specifically, with the linear edge B of the second emitting surface 2b, it is possible to form a sharp linear cutoff line at the upper end of the light distribution pattern. Further, by making the refractive index of the second light guide portion 2 higher than the refractive index of the first light guide portion 1, it is possible to make the second emitting surface 2b brighter than the first emitting surface 1b, forming the brightest region near and below the cutoff line. Further, the light distribution pattern is formed using the light guide element, which is a relatively small component, so that the headlight device can be downsized as compared to the technique described in Patent Reference 1. In this manner, this embodiment makes it possible to form, with a small configuration, a light distribution pattern for properly illuminating an area in the traveling direction of the vehicle.

(2) When the vehicle tilts or turns, by rotating the light guide element, which is a relatively small component, it is possible to properly illuminate an area toward which the driver's gaze is directed. Thus, as compared to the configuration described in Patent Reference 1, it is possible to downsize a drive means for rotating an optical component and downsize the headlight device.

(3) The cutoff line is formed using the light guide element, so that it is possible to provide a headlight device having high light use efficiency, as compared to a configuration that forms a cutoff line by means of a light blocking plate for blocking light. "Light use efficiency" refers to usage efficiency of light. Specifically, it is a ratio of the amount of light actually illuminating an illumination area to the amount of light emitted by a light source.

(4) A high illuminance region is formed by providing multiple light guide portions in the light guide element, so that it is possible to form, with a simple configuration, a high illuminance region in the light distribution pattern without the need for a complicated optical system for forming the high illuminance region.

(5) The first light guide portion (or second light guide portion) has a refractive index greater than the refractive index of air. Thus, when the light guide element is disposed in the air, the interface with the air can form the reflecting surface, and there is no need to form a mirror surface or the like around the first light guide portion (or second light guide portion).

Second Embodiment

FIG. 17 is a diagram schematically illustrating a configuration of a headlight device 200 according to a second embodiment. The headlight device 200 according to the second embodiment will be described below. Descriptions of parts that are the same as in the first embodiment will be omitted or simplified, and the same reference characters will be given to elements that are the same as or correspond to those in the first embodiment.

As illustrated in FIG. 17, the headlight device 200 includes the light source 10, a light guide element 220 that guides light from the light source 10, and the radiation optical system 30 that irradiates the irradiated surface S in front of the vehicle with light from the light guide element 220.

Figure 18:
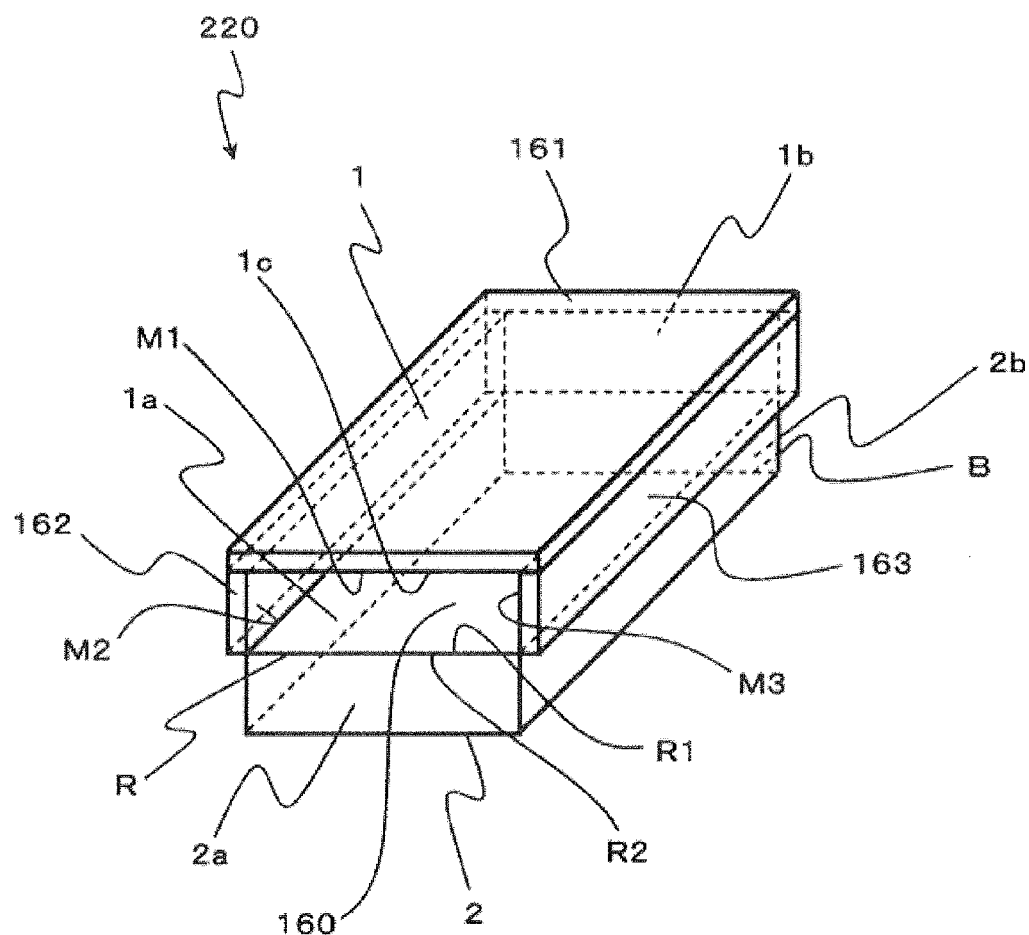
FIG. 18 is a perspective view schematically illustrating a configuration of a light guide element according to the second embodiment.

FIG. 18 is a perspective view of the light guide element 220. The light guide element 220 has the first light guide portion 1 and second light guide portion 2, similarly to the light guide element 20 in FIG. 2. However, in this embodiment, the first light guide portion 1 and second light guide portion 2 are in contact with each other via a reflecting layer R. The reflecting layer R has a reflecting surface on each of the first light guide portion 1 side and second light guide portion 2 side. Thus, the reflecting layer R reflects light in each of the first light guide portion 1 and second light guide portion 2. Here, the reflecting layer R is a mirror layer with a mirror surface R1 formed on the first light guide portion 1 side and a mirror surface R2 formed on the second light guide portion 2 side.

Further, in this embodiment, the first light guide portion 1 is an air space 160 that is in contact with the second light guide portion 2 via the reflecting layer R and is surrounded by a reflecting surface. In FIG. 18, the air space 160 constituting the first light guide portion 1 is surrounded by the mirror surface R1 of the reflecting layer R and mirror surfaces M1, M2, and M3 as the first side surface (or reflecting surface) 1c, between the first incident surface 1a and the first emitting surface 1b. Specifically, mirror members 161, 162, and 163 are disposed on the +y side, +x side, and −x side of the air space 160, respectively. The air space 160 is surrounded by a structure obtained by combining the three mirror members 161, 162, and 163 into a U-shape. Surfaces (i.e., inner surfaces) of the mirror members 161, 162, and 163 on the air space 160 side are provided with the mirror surfaces M1, M2, and M3, respectively. Thus, the air space 160 is surrounded on four sides by the mirror surfaces M1, M2, M3, and R1. The shape and dimensions of the air space 160 surrounded by the mirror surfaces are the same as those of the optical material of the first light guide portion 1 in the first embodiment.

The second light guide portion 2 is the same as that of the first embodiment, and is made of optical material, such as glass or plastic.

Figure 19:
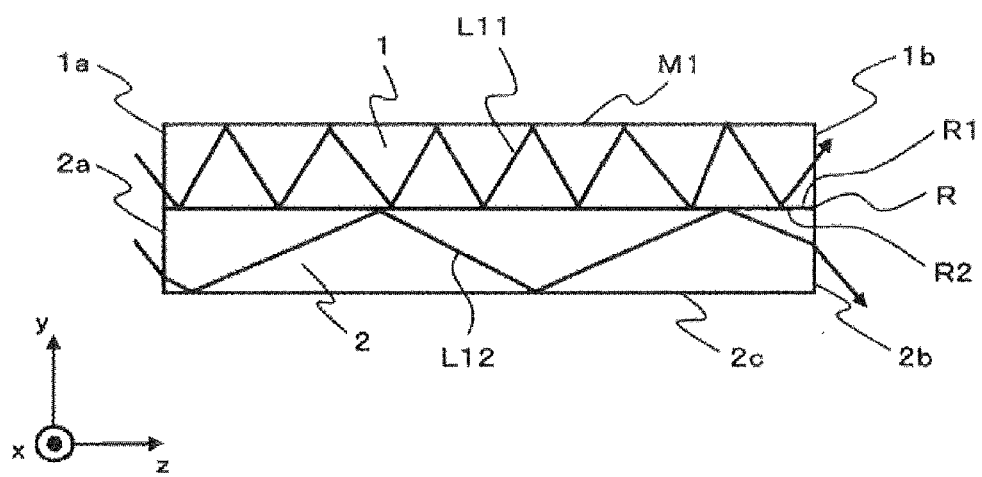
FIG. 19 is a diagram illustrating optical paths in the light guide element according to the second embodiment.

FIG. 19 illustrates an optical path L11 of light incident on the first incident surface 1a of the light guide element 220 and an optical path L12 of light incident on the second incident surface 2a. Since the first light guide portion 1 is constituted by the air space 160, light is not subjected to refraction or other action at the first incident surface 1a and first emitting surface 1b. Light incident on the first incident surface 1a propagates in the first light guide portion 1 while being reflected at the mirror surfaces R1, M1, M2, and M3 and exits from the first emitting surface 1b. Light incident on the second incident surface 2a is refracted at the second incident surface 2a, then propagates in the second light guide portion 2 while being reflected at the mirror surface R2 and the second side surface 2c, which is an interface between the second light guide portion 2 and the air, and exits from the second emitting surface 2b. In this embodiment, there is no light loss due to emission of light from the incident surface 1a as illustrated in FIG. 4(c), and reduction of illuminance due to the light loss can be prevented.

When light propagates through the first light guide portion 1, light loss due to reflection loss at the mirrors occurs; when light propagates through the second light guide portion 2, light loss due to internal absorption in the optical material occurs. However, if the first light guide portion 1 and second light guide portion 2 have the same cross-sectional area and the same amount of incident light, the first emitting surface 1b and the second emitting surface 2b are not greatly different but substantially the same in luminous intensity. In this case, by making the amount of light entering the first light guide portion 1 different from the amount of light entering the second light guide portion 2, it is possible to making the luminous intensity of the first emitting surface 1b different from the luminous intensity of the second emitting surface 2b. The amount of light entering each of the light guide portions can be adjusted by changing the position of the light source 10. In this embodiment, as illustrated in FIG. 17, the light source 10 is displaced in the −y direction from a center of the incident surface 21 in the y axis direction. This makes the amount of light entering the second light guide portion 2 greater than the amount of light entering the first light guide portion 1, making the luminous intensity of the second emitting surface 2b greater than the luminous intensity of the first emitting surface 1b.

Figure 20A:
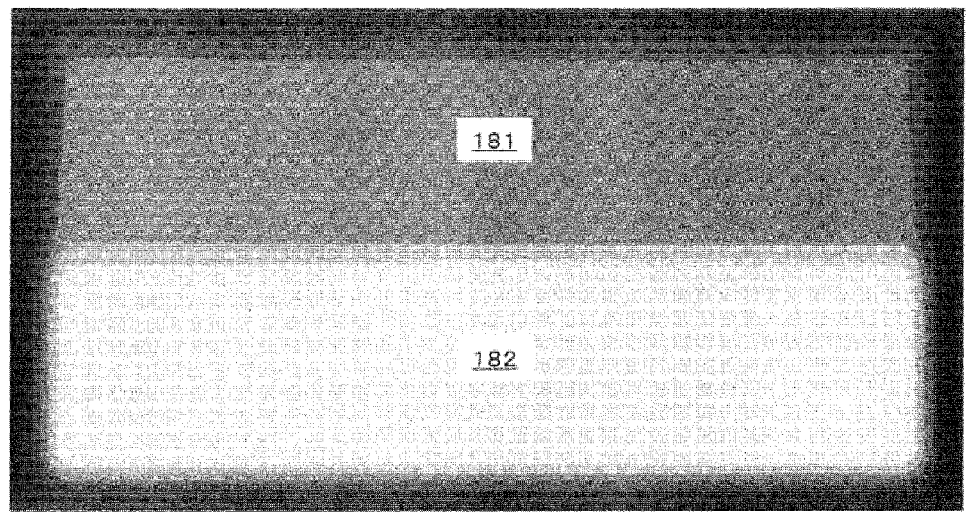
FIGS. 20(a) and 20(b) are drawings illustrating an example of simulation results of a luminous intensity distribution on an emitting surface of the light guide element according to the second embodiment.
Figure 20B:
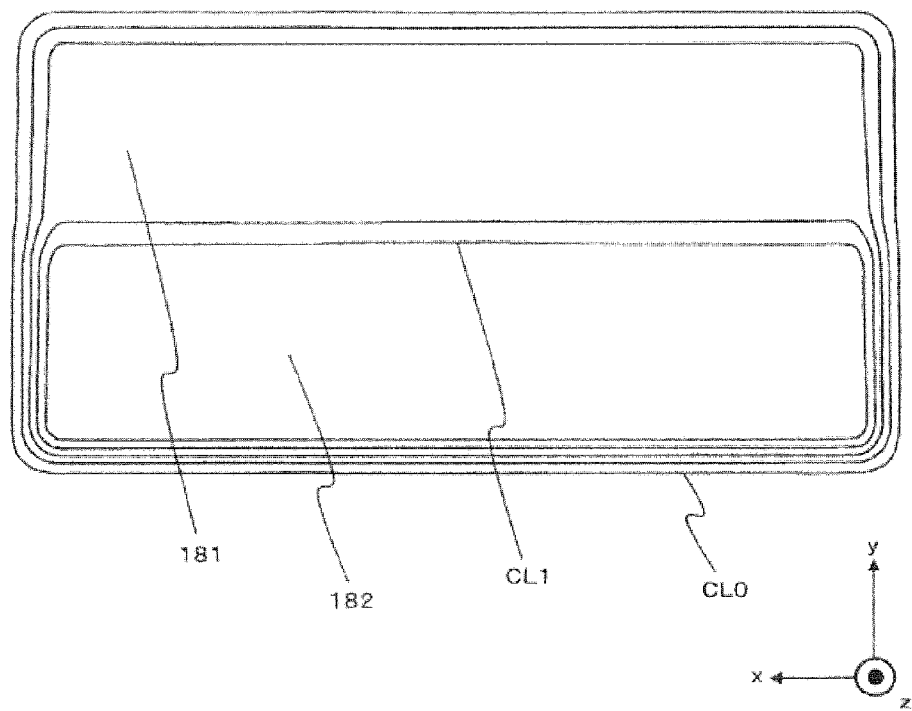

FIGS. 20(a) and 20(b) illustrate, respectively in gradation display and in contour display, an example of simulation results of the luminous intensity distribution on the emitting surface 22 of the light guide element 220. It can be seen that a second light emitting region 182 corresponding to the second emitting surface 2b is higher in luminous intensity than a first light emitting region 181 corresponding to the first emitting surface 1b. With the luminous intensity distribution on the emitting surface 22 in FIGS. 20(a) and 20(b), it is possible to illuminate an area in front of the driver particularly brightly and form a sharp cutoff line at the upper edge of the irradiated region.

As in the first embodiment, an inverted image of the emitting surface 22 is imaged on the irradiated surface S by the radiation optical system 30, and an irradiated region with an illuminance distribution similar to a luminous intensity distribution obtained by inverting the luminous intensity distribution on the emitting surface 22 is formed on the irradiated surface S. Further, as in the first embodiment, the irradiated region can be rotated by rotating only the light guide element 220.

According to this embodiment described above, the same advantages as in the first embodiment are obtained. Further, it is possible to eliminate light loss due to emission of light from an incident surface, preventing reduction of illuminance or light use efficiency due to the light loss.

Figure 21:
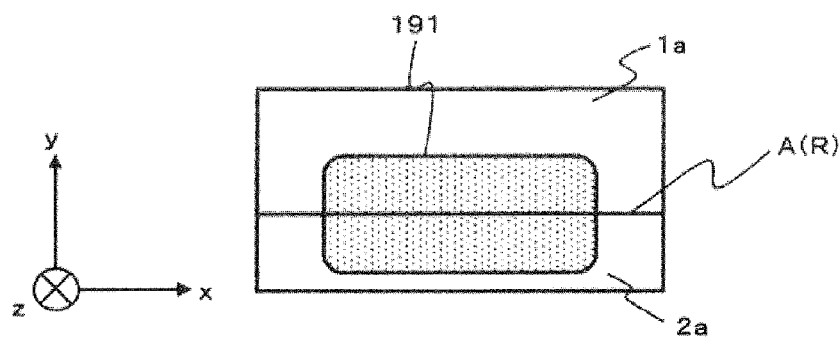
FIG. 21 is a diagram illustrating a modification example of a light guide element.

In the above first and second embodiments, the areas of the first incident surface 1a, second incident surface 2a, first emitting surface 1b, and second emitting surface 2b are substantially the same, but this is not mandatory; the areas of the respective surfaces may be appropriately set in accordance with a required illuminance distribution or the like, and may be mutually different. For example, as illustrated in FIG. 21, the area of the second incident surface 2a may be smaller than the area of the first incident surface 1a. In FIG. 21, when the area of the first incident surface 1a is denoted by S1a, the area of the first emitting surface 1b is denoted by S1b, the area of the second incident surface 2a is denoted by S2a, and the area of the second emitting surface 2b is denoted by S2b, S1a=S1b>S2a=S2b is satisfied. With this configuration, it is possible to increase the ratio Lu2/Lu1 of the luminous intensity Lu2 of the second emitting surface 2b to the luminous intensity Lu1 of the first emitting surface 1b, as compared to the case of S1a=S1b=S2a=S2b. That is, it is possible to make the second emitting surface 2b brighter relative to the first emitting surface 1b. In FIG. 21, the light source 10 and an incident region 191 of light are arranged so that the amount of light incident on the first incident surface 1a is equal to the amount of light incident on the second incident surface 2a. In this case, the luminous intensity ratio Lu2/Lu1 is great as compared to the case of FIG. 6(a). It is also possible to further increase the luminous intensity ratio Lu2/Lu1 by displacing the light source 10 in the −y direction.

Figure 22:
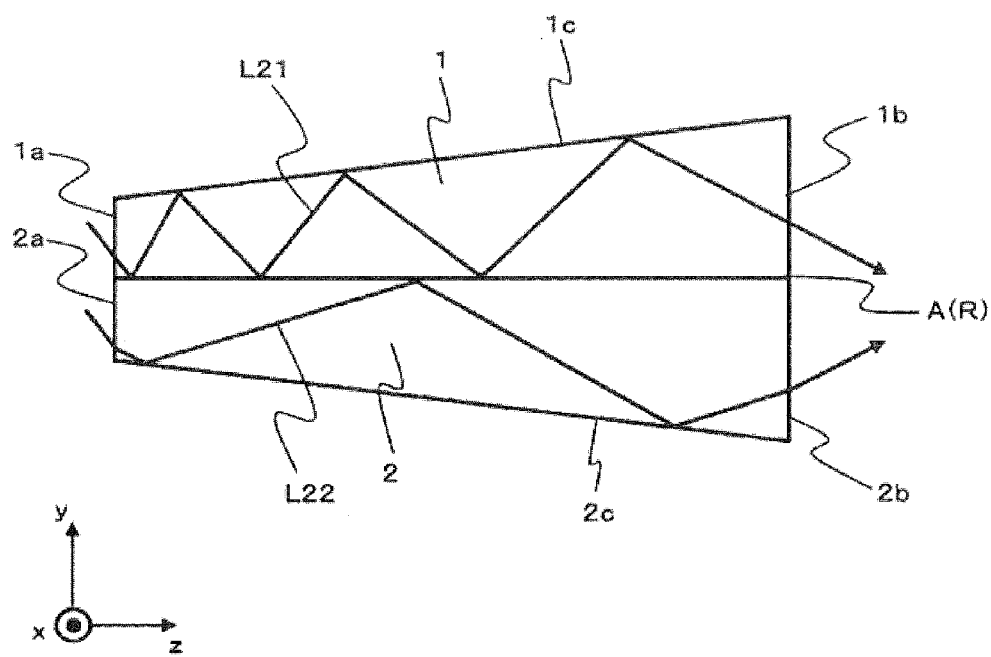
FIG. 22 is a diagram illustrating a modification example of a light guide element.

In the above first and second embodiments, each of the light guide portions has a rectangular parallelepiped shape, but the shape of each of the first light guide portion 1 and second light guide portion 2 may be appropriately changed. For example, as illustrated in FIG. 22, each of the first light guide portion 1 and second light guide portion 2 may be tapered. In FIG. 22, each of the light guide portions has a tapered shape such that the area of the emitting surface is greater than the area of the incident surface. Each of the light guide portions has a tapered shape such that the length of the emitting surface in the y axis direction is greater than the length of the incident surface in the y axis direction. That is, each of the light guide portions has a tapered shape in the y axis direction. In this case, it is possible to make the emission angle smaller than the incident angle of light on each of the light guide portions, facilitating the design of the radiation optical system 30. Each of the light guide portions may have a tapered shape in the x axis direction, or may have a tapered shape in the x axis direction and y axis direction. It is also possible that only one of the first light guide portion 1 and second light guide portion 2 has a tapered shape. FIG. 22 illustrates an optical path L21 of light incident on the first incident surface 1a and an optical path L22 of light incident on the second incident surface 2a in a case where the first light guide portion 1 and second light guide portion 2 are in contact with each other via the reflecting layer R.

Figure 23:
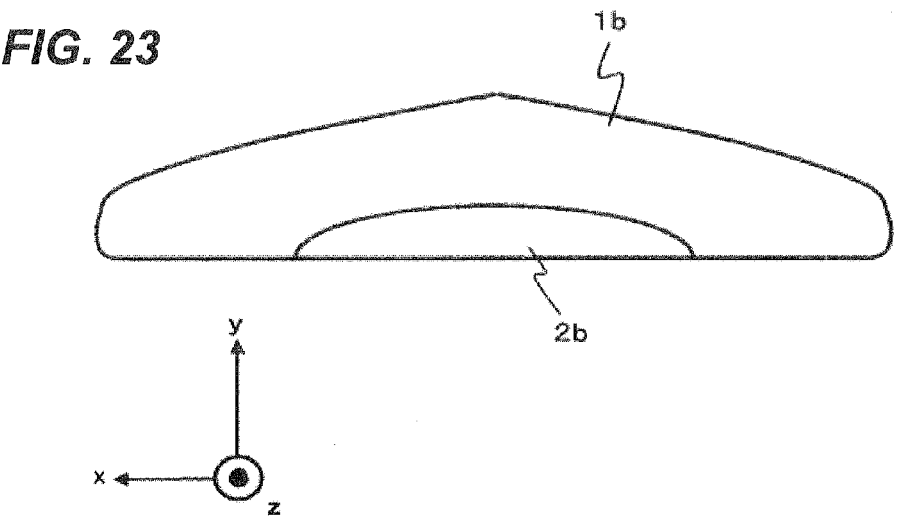
FIG. 23 is a diagram illustrating a modification example of a light guide element.

In the above first and second embodiments, the shapes of the emitting surfaces 1b and 2b of the respective light guide portions are rectangular shapes, but each of the shapes of the emitting surfaces 1b and 2b of the respective light guide portions may be appropriately changed in accordance with a required shape or light distribution pattern of the irradiated region. For example, as illustrated in FIG. 23, the shapes of the emitting surfaces 1b and 2b may be shapes having curved lines. Also, each of the shapes of the incident surfaces 1a and 2a of the respective light guide portions may be appropriately changed. For each of the light guide portions, the shapes of the incident surface and emitting surface need not be the same, but may be different from each other.

Figure 24:
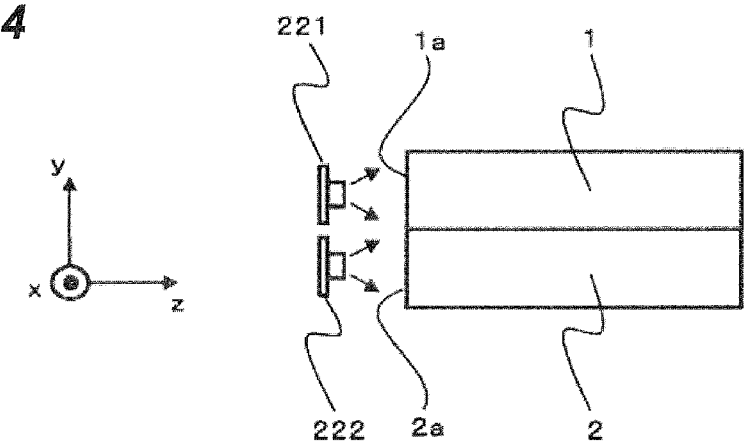
FIG. 24 is a diagram illustrating a modification example of a vehicle headlight device.

In the above first and second embodiments, one light source is used, but the number of light sources is not limited to one, and multiple light sources having the same or different light distribution characteristics may be used. For example, as illustrated in FIG. 24, it is possible that one light source 221 is disposed facing the first incident surface 1a and another light source 222 is disposed facing the second incident surface 2a.

Figure 25:
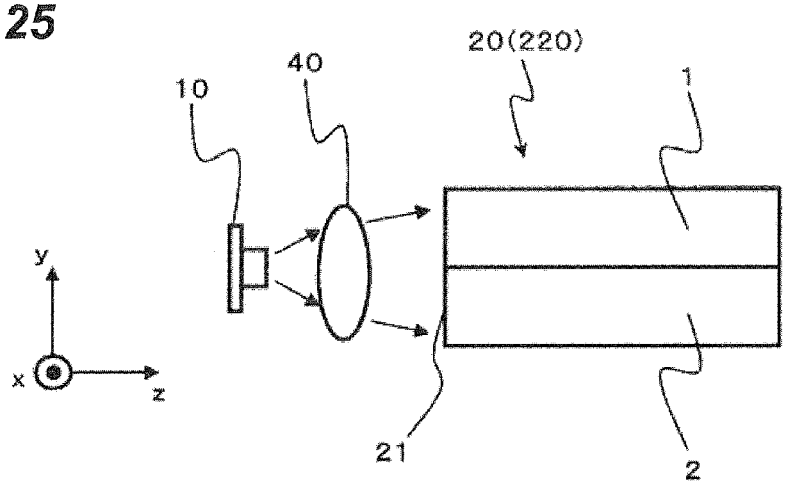
FIG. 25 is a diagram illustrating a modification example of a vehicle headlight device.

Also, as illustrated in FIG. 25, it is possible to dispose, between the light source 10 and the light guide element 20 or 220, a condensing optical system 40 for concentrating light from the light source 10 to cause it to enter the light guide element 20 or 220, so as to cause light from the light source 10 to enter the light guide element 20 or 220 at a desired divergence angle or light beam diameter. "Divergence angle" refers to an angle by which light spreads. "Light beam diameter" refers to a diameter of a light beam at a position of the incident surface 21, and is, specifically, a width at which the intensity of light is $(1/e^2)$ of the peak intensity. e is the base of natural logarithms. The condensing optical system 40 is constituted by a lens for reducing a divergence angle of light, for example. With the configuration in which the condensing optical system 40 is disposed, it is possible to cause light from the light source 10 to enter the light guide element after reducing the divergence angle or light beam diameter of the light, allowing a small light guide element to be used. Further, typically, an LED has a large divergence angle and emits a light beam in a Lambertian distribution. "Lambertian distribution" here refers to a distribution of light in the case of perfect diffusion, i.e., a distribution in which the luminance of the light emitting surface is constant regardless of the viewing direction. "Luminance" refers to the luminous intensity per unit area. When a light source, such as an LED, having a large divergence angle is used, in a configuration that causes light from the light source 10 to directly enter the light guide element, the amount of light not incident on the incident surface 21 of the light guide element or the amount of light that is incident thereon and leaks to the outside without being totally reflected at the side surface 23 is relatively large. Thus, when a light source, such as an LED, having a large divergence angle is used, it is desirable to cause light from the light source 10 to enter the light guide element after reducing the divergence angle of the light by the condensing optical system 40. This makes it possible to reduce, to a negligible degree, the amount of light not incident on the incident surface 21 and light leaking to the outside without being totally reflected.

The refractive index of each light guide portion is not limited to the above, but may be appropriately changed. Further, in the first embodiment, the first light guide portion 1 may be changed to an air space surrounded by a reflecting surface such as a mirror surface. In the second embodiment, it is possible that the reflecting layer R is removed and the air space 160 of the first light guide portion 1 and the optical material of the second light guide portion 2 are in direct contact with each other. In the second embodiment, the first light guide portion 1 may be changed to an optical material. In this case, the refractive index of the first light guide portion 1 may be the same as or different from the refractive index of the second light guide portion 2. Also, the mirror surfaces M1, M2, and M3 may be omitted. In the second embodiment, the second light guide portion 2 may be changed to an air space surrounded by a reflecting surface such as a mirror surface.

Third Embodiment

Figure 26:
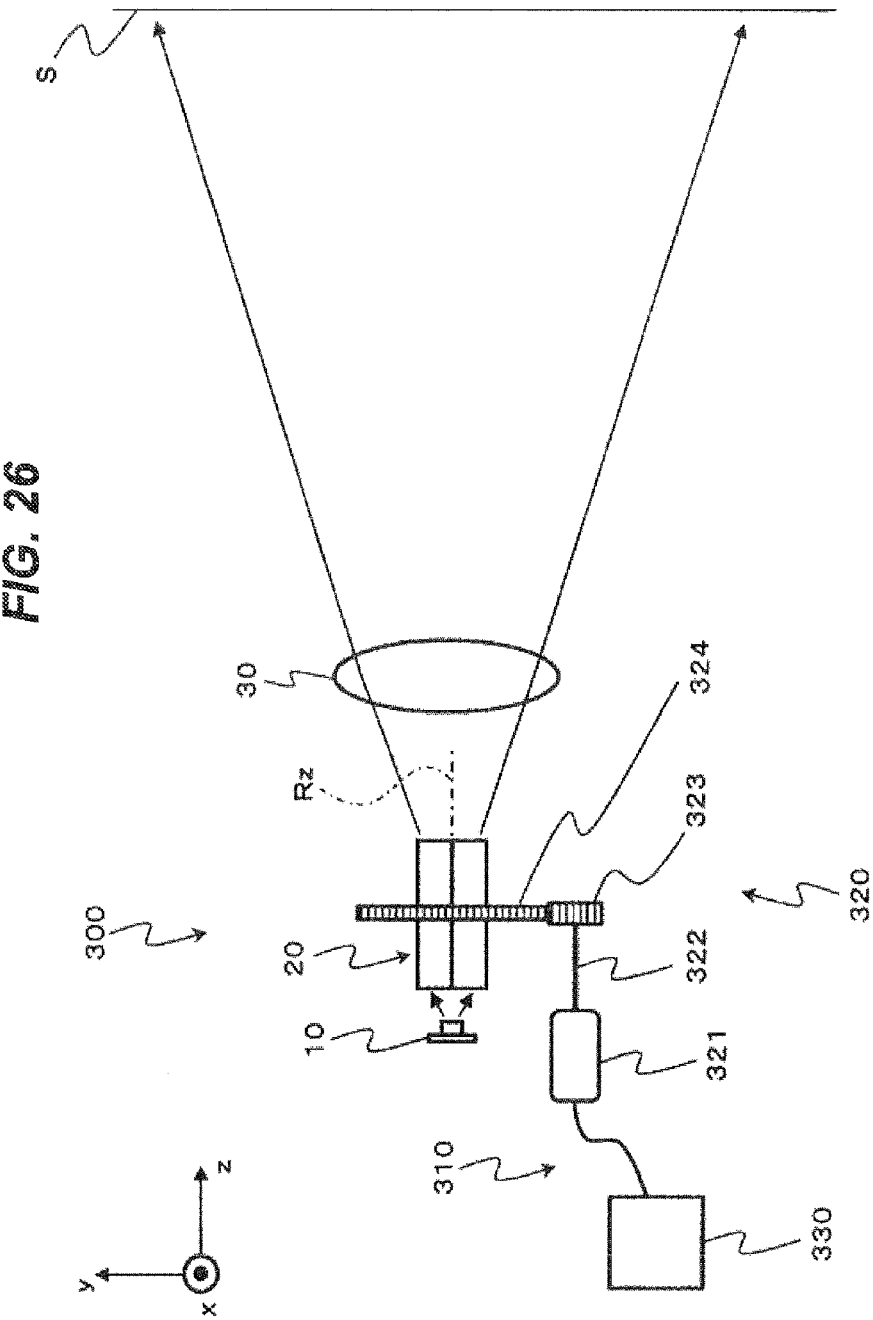
FIG. 26 is a diagram schematically illustrating a configuration of a vehicle headlight device according to a third embodiment.

FIG. 26 is a diagram schematically illustrating a configuration of a headlight device 300 according to the third embodiment. The headlight device 300 according to the third embodiment will be described below. Descriptions of parts that are the same as in the first embodiment will be omitted or simplified, and the same reference characters will be given to elements that are the same as or correspond to those in the first embodiment.

The headlight device 300 includes the light source 10, the light guide element 20 that guides light from the light source 10, and the radiation optical system 30 that irradiates the irradiated surface S in front of the vehicle with light from the light guide element 20, as in the first embodiment.

In this embodiment, the headlight device 300 further includes a drive unit 310 that rotates the light guide element 20 about a rotational axis Rz along an emission direction of light from the emitting surface 22 in accordance with a tilt angle of the vehicle. Here, the rotational axis Rz is parallel to a normal direction (i.e., the z axis direction) of the emitting surface 22. The rotational axis Rz passes through a center of the emitting surface 22. However, the rotational axis Rz is not limited to this, but may be, for example, an axis that is parallel to the z axis and passes through the origin O1 in FIG. 9(a). The drive unit 310 includes a rotation mechanism 320 and a control circuit 330.

The rotation mechanism 320 rotates only the light guide element 20 of the headlight device 300 about the rotational axis Rz relative to the vehicle body. In the example of FIG. 26, the rotation mechanism 320 includes a motor 321, a shaft 322, and gears 323 and 324. The motor 321 is, for example, a stepping motor, but may be a DC motor or the like. The shaft 322 is aligned with and mounted to a rotation shaft of the motor 321. The shaft 322 is disposed in parallel with the rotational axis Rz. The gear 323 is mounted to the shaft 322 so that a rotational axis of the gear 323 coincides with the shaft 322. The gear 323 meshes with the gear 324. The gear 324 is mounted to the light guide element 20 so that a rotational axis of the gear 324 coincides with the rotational axis Rz and the gear 324 surrounds the light guide element 20.

In the above configuration, as the motor 321 rotates, the shaft 322 rotates and the gear 323 rotates. The gear 324 rotates with the rotation of the gear 323, and thereby the light guide element 20 rotates about the rotational axis Rz.

The control circuit 330 controls the rotation mechanism 320 on the basis of a tilt angle δ of the vehicle body to rotate the light guide element 20. Specifically, the control circuit 330 rotates the light guide element 20 in a direction opposite to the tilt direction of the vehicle body by an angle equal to the tilt angle δ. For example, the control circuit 330 includes a vehicle body tilt detector for detecting the tilt angle δ of the vehicle body and controls a rotation angle and a rotation speed of the motor 321 on the basis of the detected tilt angle δ. The vehicle body tilt detector is, for example, a sensor or the like, such as a gyro.

The configuration of the drive unit 310 is not limited to the above, but may be appropriately changed. The rotation angle of the light guide element 20 is not limited to the angle equal to the tilt angle δ, but may be an angle greater than the tilt angle δ, for example. The drive unit 310 may further rotate the radiation optical system 30 in accordance with the tilt angle δ and, for example, may integrally rotate the light guide element 20 and radiation optical system 30. The drive unit 310 is applicable to the headlight device 200 of the second embodiment.

The present invention is not limited to the embodiments described above; it can be practiced in various aspects without departing from the invention scope. For example, the present invention is applicable not only to motorcycles but also to other types of vehicles, such as four-wheeled automobiles.

DESCRIPTION OF REFERENCE CHARACTERS 1 first light guide portion, 1a first incident surface, 1b first emitting surface, 1c first side surface, 2 second light guide portion, 2a second incident surface, 2b second emitting surface, 2c second side surface, 10 light source, 20, 220 light guide element, 21 incident surface, 22 emitting surface, 23 side surface, 24 light guide region, 30 radiation optical system, 100, 200, 300 vehicle headlight device, A boundary surface, B edge, R reflecting layer, R1, R2, M1, M2, M3 mirror surface, 310 drive unit.

What is claimed is:

1. A headlight device comprising:
    a light source that emits light;
    a light guide element that receives the light emitted from the light source through an incident surface and guides the received light to emit the guided light from an emitting surface; and
    a lens that magnifies and projects the light from the emitting surface ahead of a vehicle,
    wherein the light guide element includes:
    a first light guide portion that extends from the incident surface to the emitting surface and guides the received light; and
    a second light guide portion that is in contact with the first light guide portion at a boundary surface, extends from the incident surface to the emitting surface, and guides the received light,
    wherein the refractive index of the second light guide portion is greater than the refractive index of the first light guide portion,
    wherein the light guide element is configured so that part of light entering the first light guide portion enters the second light guide portion and light entering the second light guide portion is totally reflected at the boundary surface, and
    wherein the second light guide portion has a side surface facing the boundary surface, and light entering the second light guide portion propagates in the second light guide portion while being reflected at the side surface and the boundary surface and exits from the emitting surface.

2. The headlight device of claim 1, wherein the emitting surface has a first emitting surface corresponding to the first light guide portion and a second emitting surface corresponding to the second light guide portion, the first emitting surface forming a first light emitting region on the first emitting surface, the second emitting surface forming a second light emitting region brighter than the first light emitting region on the second emitting surface.

3. The headlight device of claim 1, wherein the emitting surface includes a first emitting surface corresponding to the first light guide portion and a second emitting surface corresponding to the second light guide portion, and the second emitting surface has a linear edge on an opposite side of the first emitting surface.

4. The headlight device of claim 1, wherein at least one of the first light guide portion and the second light guide portion has a refractive index greater than a refractive index of air.

5. The headlight device of claim 1, wherein the first light guide portion and the second light guide portion are both formed of glass or plastic.

6. The headlight device of claim 1, comprising a drive unit that rotates the light guide element about a rotational axis along an emission direction of light from the emitting surface, according to a tilt angle of the vehicle.

7. A headlight device comprising:
a light source that emits light:
a light guide element that receives the light emitted from the light source through an incident surface and guides the received light to emit the guided light from an emitting surface; and
a radiation optical system that radiates the light emitted from the emitting surface ahead of a vehicle,
wherein the light guide element includes:
a first light guide portion that extends from the incident surface to the emitting surface and guides the received light; and
a second light guide portion that is in contact with the first light guide portion to a boundary surface, extends from the incident surface to the emitting surface, and guides the received light,
wherein the refractive index of the second light guide portion is greater than the refractive index of the first light guide portion,
wherein the light guide element is configured so that part of the light entering the first light guide portion enters the second light guide portion and light entering the second light guide portion is totally reflected at the boundary surface, and
wherein the first light guide portion is an air space that is in contact with the second light guide portion and that is surrounded by a reflecting surface.

* * * * *

UNITED STATES PATENT AND TRADEMARK OFFICE
CERTIFICATE OF CORRECTION

| | |
|---|---|
| PATENT NO. | : 9,951,918 B2 |
| APPLICATION NO. | : 14/902279 |
| DATED | : April 24, 2018 |
| INVENTOR(S) | : Muneharu Kuwata et al. |

It is certified that error appears in the above-identified patent and that said Letters Patent is hereby corrected as shown below:

In the Claims

In Claim 7, at Column 21, Line 14, change "to a boundary source," to --at a boundary source,--.

Signed and Sealed this
Fourth Day of June, 2019

Andrei Iancu
*Director of the United States Patent and Trademark Office*